(12) United States Patent
Hales

(10) Patent No.: US 6,360,182 B1
(45) Date of Patent: Mar. 19, 2002

(54) FIELD OF VIEW UNDERWATER DIVE COMPUTER SYSTEM

(76) Inventor: Lynn B. Hales, 626 N. Little Tree Cir., Salt Lake City, UT (US) 84108

(*) Notice: Subject to any disclaimer, the term of this patent is extended or adjusted under 35 U.S.C. 154(b) by 0 days.

(21) Appl. No.: 09/427,863

(22) Filed: Oct. 27, 1999

Related U.S. Application Data

(63) Continuation of application No. 08/899,376, filed on Jul. 23, 1997, now abandoned, which is a continuation of application No. 08/518,184, filed on Aug. 23, 1995, now abandoned, which is a continuation of application No. 08/090,877, filed on Jul. 12, 1993, now abandoned, which is a continuation of application No. 07/799,366, filed on Nov. 27, 1991, now abandoned, which is a continuation-in-part of application No. 07/718,281, filed on Jun. 20, 1991, now Pat. No. 5,301,668.

(51) Int. Cl.$^7$ ............................................... B63C 11/02
(52) U.S. Cl. .................... 702/139; 702/131; 128/201.27
(58) Field of Search .............. 702/79, 92, 98, 702/99, 130, 131, 132, 136, 138–140, 166, 176–178, 179, 182, 183, 187, 189, FOR 103, FOR 104, FOR 135, FOR 139, FOR 142, FOR 143, FOR 147, FOR 170, FOR 171; 377/19, 20, 24.2, 25; 345/7–9, 40; 359/857, 630, 632, 815; 349/11, 13; 968/885, 886; 340/525, 870.16; 2/428; 128/200.24, 201.27, 204.26, 205.22, 205.23, 205.25; 73/291, 290 R, 292, 301; 374/109, 111, 112, 136, 142, 143

(56) References Cited

U.S. PATENT DOCUMENTS

| | | | |
|---|---|---|---|
| 3,712,714 A | 1/1973 | Uyeda et al. | 359/857 |
| 3,822,601 A | 7/1974 | Borom | 73/865.1 |
| 3,899,834 A | 8/1975 | Harrison | 33/352 |
| 3,915,548 A | 10/1975 | Opittek et al. | 349/11 |

(List continued on next page.)

FOREIGN PATENT DOCUMENTS

WO  WO93/00134  1/1993

OTHER PUBLICATIONS

A Consumer's Guide to History, Theory, and Performance, DIVE COMPUTERS, By Ken Loyst, Watersport Publishing, Inc.; 1991. (No month).

All Media Solid State Sensor Pressure Transducer, NOVASENSOR (No date).

Holographic Mirrors, Application of Holography, SPIE, vol. 253 (1985) pp. 203–218, (No month).

Principles and Applications of Optical Holography, Applied Optics and Optical Engineering, vol. VI, Chapter 9, pp. 357–391, 1980 (No month).

Holographic Optical Elements, TECHNICAL REPORT, LeRoy D. Dickson, TR 29.0364 Feb. 1983 (IBM) pp. 1–32.

*Primary Examiner*—Hal Wachsman
(74) *Attorney, Agent, or Firm*—Clayton, Howarth & Cannon, P.C.

(57) ABSTRACT

A system for conveying information to an underwater diver wearing a mask. The information is conveyed via a field of view display system which either superimposes the information onto the field of view of the diver or places the information within a glance of the diver. Included are sensors for measuring the pressure in the dive tanks, for sensing the depth of the diver, and for sensing the ambient temperature of the surrounding environment. A microcomputer interprets the information to provide advice such as safe assent rates. The display desirably includes a visual array for providing a visually perceptible representation of the information conveyed by the display signal as well as an optical arrangement for placing an image of the visual array at a long focus distance in relation to the eye of the diver and for magnifying the actual image of the visual array.

6 Claims, 18 Drawing Sheets

U.S. PATENT DOCUMENTS

| | | | |
|---|---|---|---|
| 3,992,948 A | 11/1976 | D'Antonio et al. | 73/865.1 |
| 4,005,282 A | 1/1977 | Jennings | 73/865.1 |
| 4,054,783 A | 10/1977 | Seireg et al. | 73/291 |
| 4,107,995 A | 8/1978 | Ligman et al. | 73/300 |
| 4,109,140 A | 8/1978 | Etra | 377/24 |
| 4,181,405 A | 1/1980 | Cohen | 349/11 |
| 4,188,825 A | 2/1980 | Farrar | 73/291 |
| 4,192,001 A | 3/1980 | Villa | 73/865.1 |
| 4,212,258 A | 7/1980 | Collins | 114/312 |
| 4,236,546 A | 12/1980 | Manley et al. | 137/88 |
| 4,250,626 A | 2/1981 | Lazar | 33/363 R |
| 4,305,057 A | 12/1981 | Rolston | 340/974 |
| 4,307,449 A | 12/1981 | Stubin | 73/291 |
| 4,336,591 A | 6/1982 | Berdzar et al. | 73/291 |
| 4,390,861 A | 6/1983 | COhen et al. | 340/980 |
| 4,402,142 A | 9/1983 | Dinsmore | 33/348 |
| 4,533,256 A | 8/1985 | Ostendorf | 968/885 |
| 4,586,136 A | 4/1986 | Lewis | 73/291 |
| 4,604,737 A | 8/1986 | Hoffman | 367/134 |
| 4,658,358 A | 4/1987 | Leach et al. | 73/865.1 |
| 4,694,583 A | 9/1987 | Blaney | 33/361 |
| 4,743,200 A | 5/1988 | Welch et al. | 434/43 |
| 4,755,023 A | 7/1988 | Evans et al. | 345/8 |
| 4,761,056 A | 8/1988 | Evans et al. | 359/631 |
| 4,782,338 A | 11/1988 | Barshinger | 345/40 |
| 4,791,729 A | 12/1988 | Suda | 33/356 |
| 4,796,365 A | 1/1989 | Hudson | 33/356 |
| 4,820,953 A | 4/1989 | Sauballe et al. | 310/338 |
| 4,869,575 A | 9/1989 | Kubik | 345/8 |
| 4,876,903 A | 10/1989 | Budinger | 73/865.1 |
| 4,882,678 A | 11/1989 | Hollis et al. | 73/865.1 |
| 4,939,647 A | 7/1990 | Clough | 128/201.27 |
| 4,949,072 A | 8/1990 | Comerford et al. | 340/325 |
| 4,970,897 A | 11/1990 | Budinger | 73/432.1 |
| 4,999,606 A | 3/1991 | Comerford et al. | 340/525 |
| 5,033,818 A | 7/1991 | Barr | 359/630 |
| 5,198,895 A | 3/1993 | Vick | 348/115 |
| 5,266,930 A | 11/1993 | Ichikawa et al. | 345/8 |
| 5,301,668 A | 4/1994 | Hales | 128/205.23 |
| 5,347,400 A | 9/1994 | Hunter | 359/815 |
| 5,414,544 A | 5/1995 | Aoyagi et al. | 349/13 |
| 5,457,284 A * | 10/1995 | Ferguson | 128/201.27 |
| 5,845,235 A * | 12/1998 | Luukkanen et al. | 702/139 |
| 5,899,204 A * | 5/1999 | Cochran | 128/205.22 |

\* cited by examiner

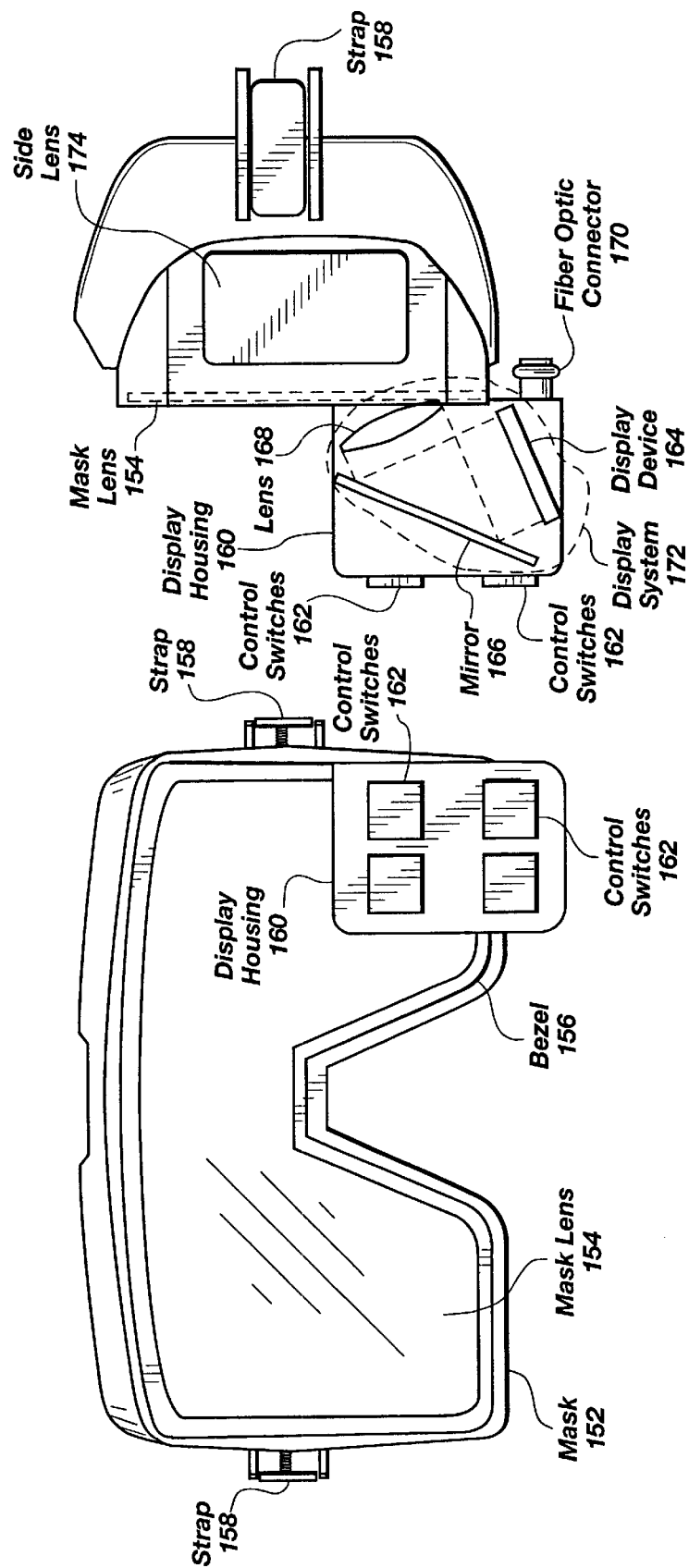

FIELD OF VIEW UNDERWATER DIVE COMPUTER SYSTEM

This application is a continuation of U.S. patent application Ser. No. 08/899,376 filed Jul. 23, 1997, now abandoned; which is a continuation of U.S. patent application Ser. No. 08/518,184 filed Aug. 23, 1995, now abandoned; which is a continuation of prior U.S. patent application Ser. No. 08/090,877, filed Jul. 12, 1993, now abandoned; which is a continuation of U.S. patent application Ser. No. 07/799,366 filed Nov. 27, 1991, now abandoned; which is a continuation-in-part of U.S. patent application Ser. No. 07/718,281 filed Jun. 20, 1991, which issued as U.S. Pat. No. 5,301,668 on Apr. 12, 1994.

BACKGROUND

This application contains a computer program listing appendix submitted on compact discs and incorporated herein by reference. Said computer program listing appendix is contained in a single file having the name "programming code appendix," created Apr. 25, 2001, and having a size of 18,000 bytes. Said computer program listing is submitted in duplicate (two discs).

1. The Field of the Invention

This invention generally relates to apparatus used in connection with underwater diving equipment. More particularly, the present invention relates to equipment used to apprise an underwater diver of important information needed to efficiently use diving time and to maintain safe diving conditions.

2. The Background Art

The introduction of underwater diving using Self-Contained Underwater Breathing Apparatus (SCUBA) in the 1940's by Jacques-Yves Cousteau and Emil Gagnan opened up new possibilities in underwater exploration. Today, scuba diving is a very popular sport as well as an indispensable professional activity. It is estimated that more than 3,000,000 divers are currently "open water" certified and that another 600,000 new divers are certified worldwide each year. Thus, diving is expected to become more widespread both as a recreational activity and as a professional endeavor.

Regardless of the expansion of diving, it is considered by many to be an inherently dangerous activity. Thus, safe diving practice as well as the science and physiology of diving are taught as part of the open water certification process. Safety procedures and practices are continually being emphasized by manufacturers, educators, and participants in the industry.

In order to allow the recreational diver to participate in the sport both safely and enjoyably, it is imperative that the diver be apprised of environmental conditions during the dive as well as the status of the diving equipment. Such environmental conditions and equipment status include the elapsed time of the dive and the maximum depth of the dive and the time spent at the maximum depth. It is also important to keep an accurate log of each dive made in the recent past so that repetitive dives over a period of time can be safely performed.

While underwater diving has many hazards, one of the hazards which can be managed is decompression sickness (DCS), commonly known as the "bends." DCS comes about because inert gases (principally nitrogen, which is the major constituent of air compressed into the air tanks of most divers), are absorbed into the blood and tissues of a diver during a dive. The greater the depth of the dive (i.e., the greater the ambient pressure on the diver) and the length of the dive, the greater the amount of nitrogen which is absorbed into the diver's blood and tissues. If the diver rapidly returns to a shallower depth, or to the surface, the decrease in ambient pressure causes the nitrogen to be deabsorbed and harmful bubbles form in the tissue and blood.

The process of absorption and deabsorption of nitrogen into the blood and tissues is governed by Boyles Law and the fact that the partial pressures of inert gases (principally nitrogen), increases as the diver proceeds deeper into the dive. This causes a disequilibrium between the inert gases in the blood, fluids, and tissues of the diver's body and the air mixture being inhaled. This disequilibrium causes more of the inert gases to be absorbed by the body of the diver. Upon assent to the surface the ambient pressure is reduced and the disequilibrium is again created. This time however, excess gases are deabsorbed by the body fluids and tissues into the air mixture being exhaled. If the dissolved gases are released too quickly they form bubbles in the blood, fluids, joints, and other tissues of the diver's body which can cause problems ranging from minor discomfort to death.

DCS can be controlled by monitoring dive conditions, limiting dive depth and the length of the dive, and controlling the assent rate to the surface. Nevertheless, due to human nature and other realities of diving, divers occasionally encounter DCS because of miscalculations or misjudgments.

Potential problems with DCS exist in every dive and are dealt with by educating the diver about safe dive depths, dive times, and assent rates. Such variables can be very roughly manually calculated using dive tables, for example those provided by the U.S. Navy and other organizations, to determine the safe rate of assent from a maximum depth in conjunction with the time spent at that maximum depth. Importantly, both professional and recreational divers require accurate information about the parameters of their dives so that diving time and the depths can be maximized.

In order to give the diver the information needed to plan and control a safe dive, a diver is now often equipped with underwater stop watches, conventional magnetic compasses, analog scuba tank pressure gauges, and depth gauges, as well as, on occasion, a thermometer. Recently, carry-along dive computers, which monitor various environmental and equipment sensors and perform dive table type calculations, have been available to provide important information to a diver during the course of the dive.

Provided in FIG. 1 is a representation of a diver, generally indicated at 10, using one of several previously available carry-along dive computers. In the arrangement illustrated in FIG. 1, the dive computer console 18, which includes gauges or indicators 19, is connected to a scuba air tank 12 by way of a high pressure hose 20 which communicates the pressure within the scuba air tank 12 to the dive computer console 18. The diver 10 receives air from the tank 12 via a conventional mouth piece 14 connected to the tank by a low pressure hose (not represented).

In the arrangement represented in FIG. 1, the dive computer console 18 hangs down behind the diver 10, traditionally on the left side of the diver. In some instances, the dive computer console is held in the diver's hand or is attached to the diver's arm.

One readily recognized problem with the arrangement for a dive computer shown in FIG. 1 is that the diver must reach for, and grasp, the dive computer console 18 and bring it into his field of view each time the gauges or indicators 19 are to be checked. Because the diver 10 must make a conscious effort to reach for the dive computer console 18 and bring it into his field of view, it is less likely that the diver 10 will check the gauges or indicators 19 as often as is desirable due to environmental distractions or due to a task at hand. Also, because it is not easy to find and grasp the dive computer console 18, in a panic moment or critical situation the diver may be unable to quickly grasp it and/or bring it into his field of view.

Moreover, the arrangement using a dive computer console 18 attached to the tank 12 via a high pressure hose 20 poses the safety risk of the high pressure hose 20 or dive computer console 18 snagging or catching on underwater objects such as coral. The dangers posed by rupturing the high pressure hose 20 are readily evident.

Additionally, in murky or turbid water it may be impossible to observe the gauges or indicators 19 unless they are placed against the viewing window of the diving mask 16. This requires the diver 10 to divert his attention from the task at hand on a regular basis or from a dive buddy (companion) which the diver 10 should be continuously observing in order to ensure the dive buddy's safety. Moreover, when divers are exploring coral reefs constant attention should be paid to avoiding contact with the reef; both unintentional and intentional contact by divers is rapidly causing the destruction of many coral reefs in the world.

Because of these and other drawbacks and problems encountered in the present state of the art, it would be a great advance in the art to provide a dive computer which overcomes these disadvantages by providing safer and more efficient underwater diving.

BRIEF SUMMARY AND OBJECTS OF THE INVENTION

In view of the above described state of the art, the present invention seeks to realize the following objects and advantages.

It is a primary object of the present invention to provide a dive computer system which conveys important information to a diver in a more safe and efficient manner than previously available devices.

It is also a significant object of the present invention to provide a dive computer system which efficiently conveys important information to the diver without diverting the diver's attention away from the surrounding environment.

It is another object of the present invention to provide a dive computer system which can provide information to the diver directly in front of the diver's eye and always within the diver's field of view which does not block the diver's view of the surrounding environment.

It is a further object of the present invention to provide a dive computer which does not present any hazardous high pressure hoses or consoles which can snag on underwater objects and formations or become entangled with the diver's other equipment.

It is another object of the present invention to provide a dive computer which does not present any additional dangers to a diver such as the rupturing of a high pressure hose or severing of an electrical cable.

It is still another object of the present invention to provide a dive computer system which includes a compass function and which provides hands-free operation and which operates reliably when the diver is positioned in any of a number of orientations.

It is also an object of the present invention to provide a dive computer which provides long operating time without changing or recharging batteries.

It is a further object of the present invention to provide a dive computer system which presents continuously updated information within the diver's field of view and which can accommodate a variety of eyesight parameters, facial structures, and eye shapes and sizes.

It is yet another object of the present invention to provide a dive computer which projects the image onto the diver's field of view and which does not block any of the diver's view of the surrounding environment.

It is another object of the present invention to provide a field of view display which can be used in association with a variety of different types of masks so that information can be conveyed to the user without requiring the user to make any head movements or hand movements.

Another object of the present invention is to provide a field of view display which can be integrally formed in a mask or retrofit onto an existing mask.

These and other objects and advantages of the invention will become more fully apparent from the description and claims which follow, or may be learned by the practice of the invention.

The present invention provides a great advance in the art pertaining to devices and systems used to improve the efficiency and safety of underwater diving as well as providing an improved system for conveying information to users wearing a mask over their eyes. The present invention is primarily intended to be used as a system for conveying information to an underwater diver wearing a mask but can also be used in other applications.

The present invention keeps an underwater diver informed of important information during a dive without requiring the diver to divert his attention from the surrounding environment. Underwater divers generally wear a mask which includes a viewing window or lens through which the diver is provided a field of view of the surrounding environment.

The preferred embodiments of the present invention include a means for sensing the pressure in at least one tank, holding a breathable gas supplied to the diver, and for generating a tank pressure signal. Also included is a means for sensing the depth under the surface of the water the diver is submerged. The means for sensing the depth also generates a depth signal. Additionally, a means for processing the tank pressure signal and the depth signal is included. The means for processing generates a display signal which contains information which is to be conveyed to the diver. The means for processing preferably comprises a microcomputer and its associated signal processing circuitry.

A means for displaying the information conveyed by the display signal within the diver's field of view is also provided. The means for displaying is arranged such that the diver is able to visually perceive the information without any movement, or only a slight movement, of an eye and without any need to substantially refocus eyesight within the field of view. Desirably, a means for holding the means for displaying in a position on the mask is provided. Thus, the diver or other user is apprised of important information without moving his head or hands.

The means for displaying can desirably include a visual array means for providing a visually perceptible representation of the information conveyed by the display signal. The means for displaying preferably also includes a means for placing an image of the visual array means at a focus distance in the range from about six feet to about infinity, and most preferably in the range from about three feet to about infinity, in relation to the eye of the diver, as well as, a means for magnifying the actual image of the visual array means such that the diver can readily observe the image of the visual array means.

The structures of the means for displaying, or the field of view system, can be carried out using lenses, mirrors, and/or other conventional or holographic optical components. Such optical components can include lenses, combiners, prisms, various lens coatings designed to affect and control transmission and reflectively of individual components and other optical components, both those currently available and those which may become available in the future. Since a user of the present invention may often be found in an environment where there is little or no ambient light, some embodiments may include means for providing light on the display in the case of displays which are not self illuminating. Significantly, the embodiments of the present invention can be configured integrally with a mask or other components or, alternatively, can be added to existing components, e.q., masks and tanks, as a retrofit.

Also included in some preferred embodiments of the present invention is a means for detecting changes in the relative orientation of the earth's magnetic field and generating a compass signal with respect to its orientation in the earth's magnetic field. The compass signal is also processed by the means for processing and presented to the diver as an image within the diver's field of view.

Preferably, the means for detecting changes in the relative orientation in the earth's magnetic field comprises a fluxgate compass device. Other devices, both those now available and which become available in the future, can also be used within the scope of the present invention as a compass sensor. In order to allow the compass sensor to properly operate in a diving environment, it is preferred in some embodiments of the present invention to provide a means for maintaining the compass device in substantially the same orientation in one (horizontal) plane. The means for maintaining the compass device in substantially the same orientation desirably can include suspending the compass sensor in a liquid to dampen transient movements. Also, embodiments of the present invention can further include arrangements, either in the form of hardware or software, which reduce or eliminate the need to maintain the compass sensor in the same physical orientation.

The display means can desirably include a light emitting diode array, a liquid crystal display (preferably with supplemental illumination), or some other solid state array device. In most preferred embodiments, many of the sensors will be positioned remotely from the means for displaying and an optical link, such as a fiber optic cable which is inherently safer and more reliable in an underwater environment than electrical cables, is provided to convey signals between the components.

The preferred embodiments of the present invention also can include means for sensing the ambient temperature of the surrounding environment. The means for sensing the ambient temperature generates a temperature signal that can be visually represented on the means for displaying. A means for conveying audio messages to the diver can also be provided. The means for displaying can also include: means for displaying the temperature of the water surrounding the diver; means for displaying the minimum temperature of the water encountered on the most recent dive; means for displaying the current depth of the diver under the surface of the water; means for displaying the maximum depth under the surface of the water encountered on the most recent dive; structures for displaying the current pressure found within the tank; structures for displaying the elapsed time since the beginning of the most recent dive; as well as, means for calculating and displaying the time remaining before a diver must ascend, means for calculating and displaying to the diver a plurality of ascent stop level needed to avoid DCS, and means for calculating and displaying the diver's ascent rate.

As will be appreciated, the present invention includes combinations of features and structures heretofore unknown and not suggested in the available pertinent art. The present invention solves problems which have been unrecognized and/or unsolved for a long time.

BRIEF DESCRIPTION OF THE DRAWINGS

In order to better appreciate how the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which:

FIGS. 4A and 4B are front and side views, respectively, of another embodiment of the present invention wherein the optical display is fitted onto the front of an existing dive mask so that the existing dive mask is retrofitted with an embodiment of the present invention.

DETAILED DESCRIPTION OF THE PREFERRED EMBODIMENTS

Reference will now be made to the drawings wherein like structures will be provided with like reference designations.

As explained earlier, previously available dive computers have several inherent drawbacks and disadvantages. A principle drawback present in the earlier dive computers is that the diver must be distracted from the surrounding environment and his dive companion in order to make use of the device. The described embodiments of the present invention overcome this heretofore unrecognized problem and/or unsolved problem by providing structures which present needed information to the diver within the diver's field of view, e.g., with not more effort than required for a quick eye glance.

Moreover, the present invention provides additional features which greatly add to the convenience and safety of a diver which will be explained in detail hereinafter. While the preferred embodiments of the present invention are described herein for use in an underwater diving environment, the present invention has application in many different settings. For example, the present invention can advantageously be used by persons wearing a mask, helmet, or other mask-like structure, such as those used by fire fighters, rescue workers, motorcyclists, or others, who need to be continually apprised of the value of one or more measurable parameters concerning them, i.e., a physiological variable, or their environment, i.e., the temperature.

Figure 2A:
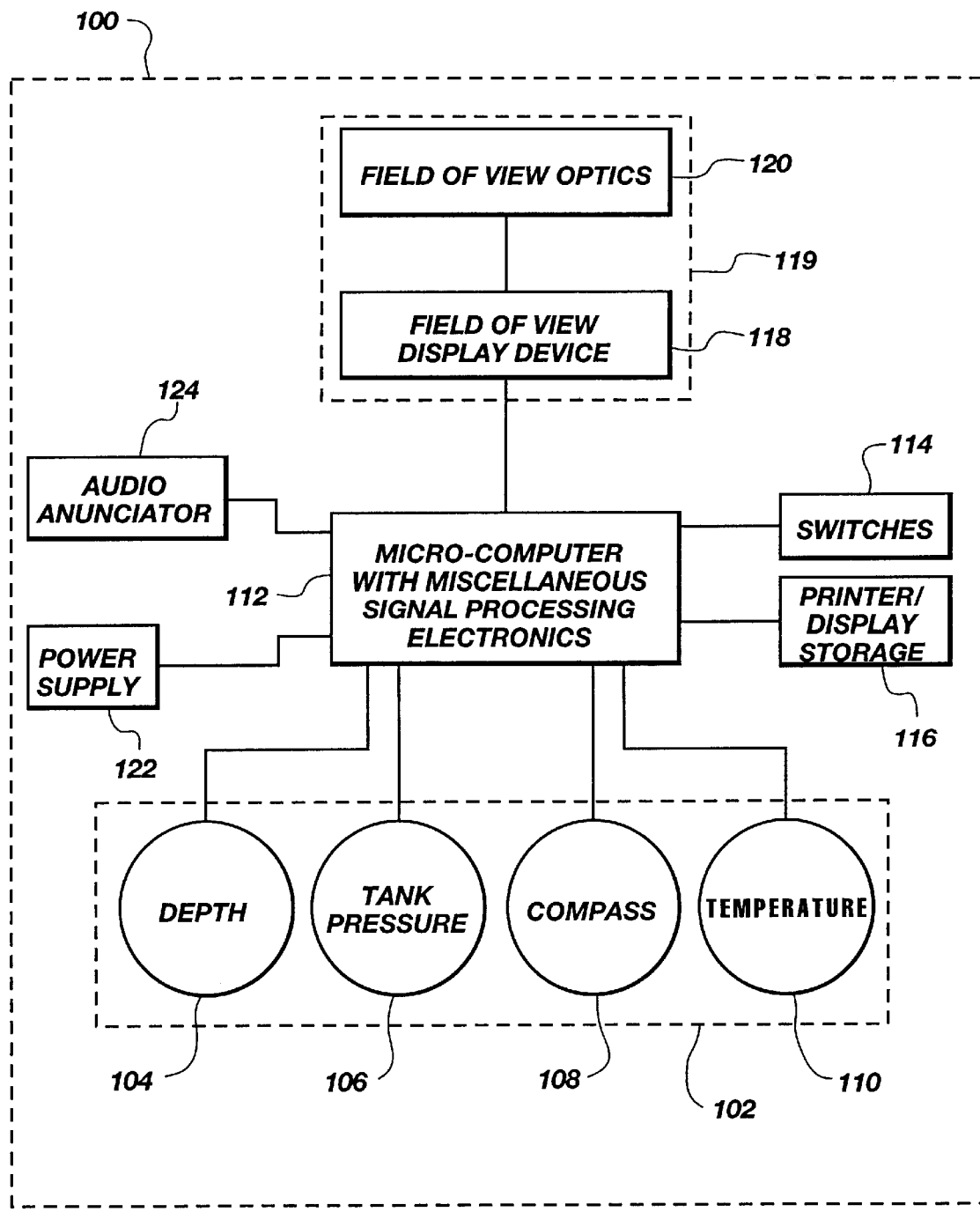
FIG. 2A is a block diagram of one presently preferred embodiment of the present invention.

Referring first to FIG. 2A, within dashed box 100 is a block diagram representing the principal components included in the presently preferred embodiment of the present invention. Represented in FIG. 2A is a sensor block 102 which includes a depth sensor 104, a tank pressure sensor 106, a compass sensor 108, and a temperature sensor 110. Each of these sensors and their relationship with other apparatus components will be explained in detail later in this disclosure. All of the described sensors are exemplary of a means for sensing the value of at least one measured parameter.

It will be appreciated that the depth sensor 104 and the temperature sensor 110 provide information needed for avoiding DCS. The depth sensor is preferably one available from Fujikura, Model FPB-04A. The temperature sensor 110, which is preferably one of the silicon temperature sensors available from Motorola Semiconductors of Phoenix, Ariz. and which will be more fully described in connection with FIG. 10, is the presently preferred example of a means for sensing the ambient temperature of the surrounding environment and for generating a temperature signal. Many structures, including those now available and those which will become available in the future, can be used within the scope of the means for sensing the ambient temperature of the surrounding environment.

The compass sensor 108 is used to provide helpful directional information to the diver who, for example, may be working in murky water where it is easy to become disoriented. The compass sensor, which is preferably the device described in connection with FIGS. 9A–9C, and its associated components function as the presently preferred example of a means for detecting changes in the relative orientation of the earth's magnetic field and generating a compass signal with respect to its relative orientation in the earth's magnetic field.

One skilled in the art will appreciate that many structures, other than those explicitly disclosed herein, can serve as the means for detecting changes in the relative north-south orientation of the diver in the earth's magnetic field. As used herein, the term "compass heading" or compass sensor is intended to encompass any directional system or apparatus which functions to provide the user information on his terrestrial orientation.

The tank pressure sensor 106 provides information needed to determine the amount of air which remains for the diver to use; an essential fact if a diver is to make optimum use of his diving time. While it is preferred that all of the mentioned sensors be included in embodiments of the present invention, it is within the scope of the present invention to include less than all of the mentioned sensors and still obtain many of the advantages which are obtained by the present invention.

The tank pressure sensor described herein is the preferred example of a means for sensing the pressure in at least one tank holding a breathable gas supplied to the diver and for generating a tank pressure signal. It will be appreciated that many other structures performing similar or equivalent functions can also serve as a means for sensing the pressure in a tank.

The depth sensors described herein are the presently preferred examples of a means for sensing the depth under the surface of the water the diver is submerged and for generating a depth signal. Those skilled in the art will readily be able to substitute other components performing similar or equivalent functions using the teachings contained herein to carry out the means for sensing the depth.

Also represented in FIG. 2A is a microcomputer 112. Associated with the microcomputer 112 is a variety of signal processing electrical components which will be further identified later. Significantly, the microcomputer 112 is programmed to receive the information generated by the depth sensor 104, the tank pressure sensor 106, the compass sensor 108, and the temperature sensor 110 to provide valuable information to the diver concerning the time which the diver can remain underwater, the direction the diver is oriented, the depth of the diver, as well as other information as will be explained and as will be recognized by those skilled in the art.

The microcomputer 112 and its associated signal processing circuitry, further described herein in connection with FIG. 10, is the presently preferred example of a means for processing the various signals from the sensors and for generating a display signal. It is to be understood that many other arrangements, both those now known or which become available in the future, which perform similar or equivalent functions can also operate within the scope of the means for processing of the present invention. Those skilled in the art will be able to readily devise such alternative arrangements using the teachings contained herein.

A power supply 122 is also represented in FIG. 2A which is preferably battery operated so that the embodiment can operate independently of any other power source. It is also desirable to include power conservation schemes, such as switching components on and off and utilizing low power consumption components, in order to maximize the useful life of the batteries or other power source which is included in the power supply 122.

Also represented in FIG. 2A are switches 114 which are used to control the operation of the apparatus 100. Such switches 114 can include single pole, single throw on-off switches, multiple position switches, a numeric or alphanumeric keyboard, or other input devices. Also indicated in FIG. 2A is an audio annunciator 124 which optionally can be included to convey audio messages to the diver. In some cases, it will be desirable to be able to download data or programming into the microcomputer 112 and such input devices can also be chosen to facilitate such downloading, either manual or automated, as will be understood by those skilled in the pertinent arts.

Also represented in FIG. 2A are a printer/display device 116 which can include automated data reception and storage devices used to obtain data which is uploaded from the microcomputer 112 via a communications port using techniques which are known in the art. The printer/display device 116, for example a dot matrix or thermal printer or a video display, is desirably used to obtain information, and desirably compile a dive log, for review and/or analysis from the microcomputer 112 after a diver has returned to a boat or to land after one or more dives have been completed.

Still referring to FIG. 2A, a field of view display device 118 is included in the embodiments of the present invention to convey information to the diver. The display device 118 is preferably a miniaturized, light emitting diode array or some other low power consumption device such as a liquid crystal display (LCD) but other types of displays may be used within the scope of the present invention. For example, the field of view display device 118 may be one of many broad spectrum emission devices which are now available or one of numerous narrow band emission devices available in the art. Furthermore, if needed in a particular application, additional back lighting or illumination devices may also be included.

In accordance with another aspect of the present invention, a field of view optics 120 and field of view display device 118 comprise a field of view display system as indicated by dashed box 119. The field of view optical components 120 function to convey the information presented by the field of view display device 118 to the diver's, or other user's, field of view. A diver who is wearing a diving mask 16 (FIG. 1) generally has a wide field of view of the surrounding environment. The field of view display system 119 allows the user to visually perceive the information provided by the field of view display device 118 requiring, at most, a glance from the user to obtain the information. Preferably, no hand or head movement is necessary for the user to view the information.

The field of view optics 120 provided in the described embodiment magnifies the image of the field of view display device 118 and also make it so that the user is not required to significantly change the focus of his eye as he changes his view from the surrounding environment to the information presented by the field of view display device 118, even though the field of view display system 119 is preferably positioned in the range from about 0.5 inches to about 8 inches, and most preferably in the range from about 0.5 inches to about 3 inches, from the eye. It will be understood that the field of view display device 118 and the field of view optics 120 must work together in order to achieve optimum performance of the embodiments of the present invention. The preferred components for carrying out these functions will be discussed shortly.

Figure 2B:
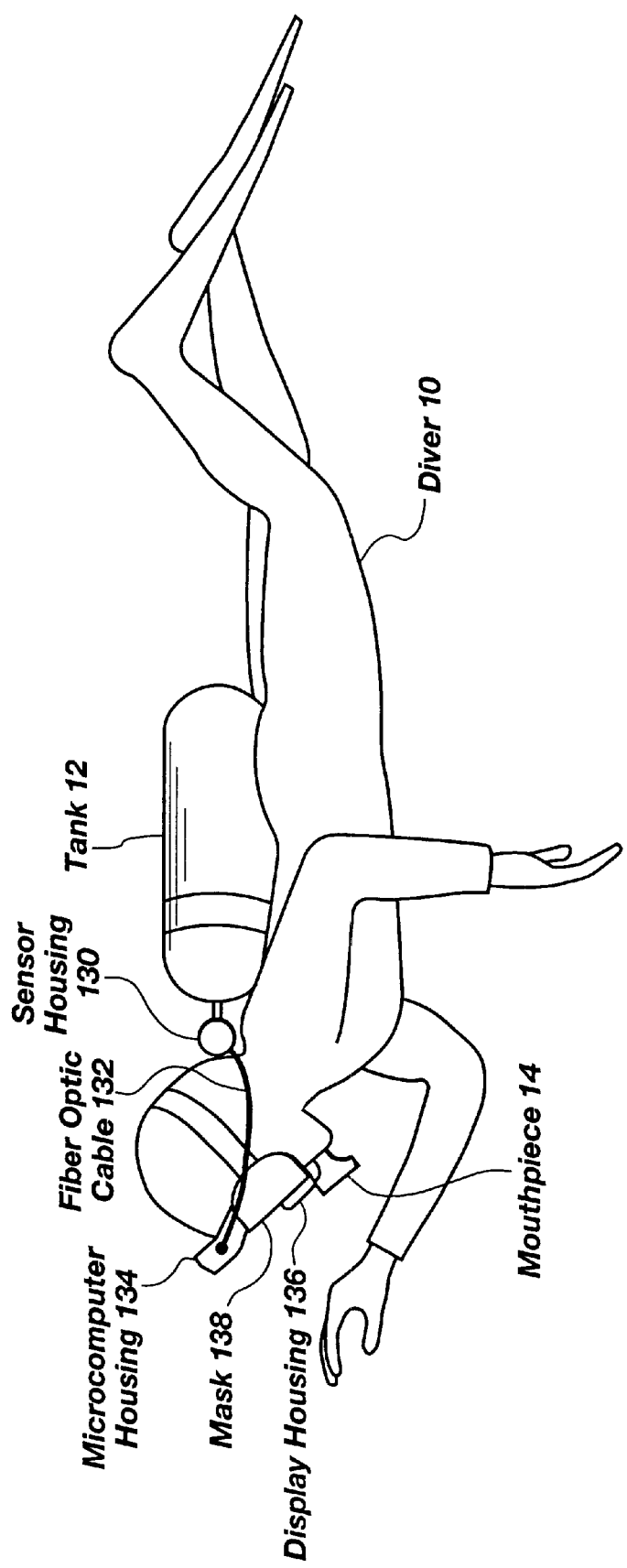
FIG. 2B is a side view of a diver using a presently preferred embodiment of the present invention.

Referring next to FIG. 2B, a side view of a diver using a presently preferred embodiment of the present invention is provided. The diver 10 is equipped with conventional underwater diving equipment including the scuba air tank 12. In addition to the conventional equipment connected to the scuba air tank 12, i.e., a regulator, a sensor housing 130 has been added to, or preferably incorporated into, the regulator. The sensor housing 130 contains the tank pressure sensor 106, and can accommodate other sensors such as the depth sensor 104, the compass sensor 108, and the temperature sensor 110 (see FIG. 2A). Another preferred arrangement is to locate such sensors in a housing mounted on the mask 16.

It will be appreciated that the various sensors included in the preferred embodiments of the present invention may be housed in locations different than those described herein. For example, the signal processing circuitry of the sensors, or in some cases the transducer portion of the sensors, can be located in a microcomputer housing 134. The microcomputer housing 134 is fashioned integrally with diving mask 138 which is strapped to the diver's 10 head. The weight of the components located within the microcomputer housing 134 should minimal enough to not hinder the movement of the diver's head. It will be understood that the sensor housing 130 and the microcomputer housing 134 must be fabricated so as to be water tight and with appropriate apertures for the sensor transducers and cables. Any batteries (not represented) needed to operate the components can be located in either housing, or both housings, as desired.

It is preferred that the necessary connection between the sensor housing 130 and the microcomputer housing 134 be made using a fiber optic cable 132. Those skilled in the art will appreciate that a properly selected fiber optic cable is a safe and secure component. The fiber optic cable, and its associated components, are a preferred example of the present invention's communications means for establishing a communicating path. It will be appreciated that other components, including "wired" and "wireless" communication components, can function as the communication means of the present invention.

The placement of the tank pressure sensor 106 and the other sensors adjacent to the tank 12, and then communicating any signals to and from the sensors via the fiber optic cable 132, is inherently safer than including a high pressure hose (20 in FIG. 1) between the tank 12 and a sensor found in previously available apparatus.

In the embodiment represented in FIG. 2B, the field of view display system (119 in FIG. 2A) is integral with the diving mask 152 and located in a display housing 136. While it is preferred that the electrical and optical components of the field of view display system be formed integrally with the diving mask 138, it is within the scope of the present invention to fabricate the necessary components as a retrofit to existing diving masks or separate from the diving mask as will be explained shortly.

The display housing 136, and any other structures required to hold the field of view display system in place as known by those skilled in the pertinent arts, is the presently preferred example of a means for holding the field of view display system in position on the mask. It is to be understood that many other structures now known, or which will become available in the future, can also perform the function of the claimed means for holding.

Figures 3A, 3B:
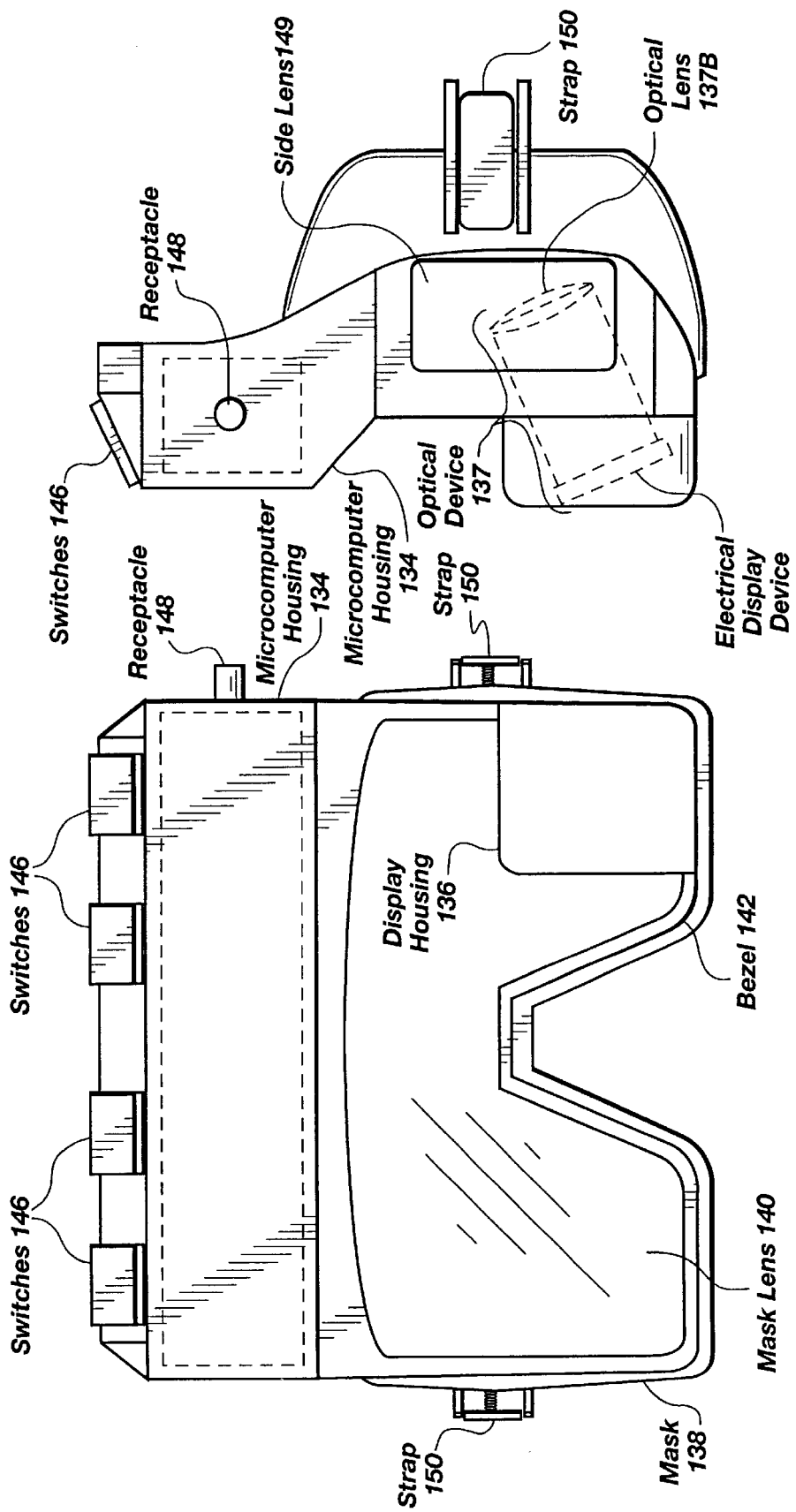
FIGS. 3A and 3B are front and side views, respectively, of a preferred embodiment of the present invention in which many of components, including an optical display, have been integrated into a dive mask.

Reference will next be made to FIGS. 3A and 3B which are front and side views, respectively, of the diving mask 138 included in one presently preferred embodiment of the present invention. The diving mask 138 includes a front lens 140 which provides a field of view to the diver. A diving mask bezel 142 holds the lens in place and also is configured to hold the display housing 136 in place. Also represented in FIGS. 3A and 3B is a strap 150 which functions to keep the diving mask 138 in place on the head of the diver. A side lens 149 is also included in the particular diving mask represented in FIG. 3B.

Formed on the top side of the diving mask 138 is the microcomputer housing 134. Formed on the upper side of the microcomputer housing 134 are a plurality of control switches 146. The illustrated position of the control switches 146 is preferred since it provides a convenient and easy-to-reach location for the diver. The control switches 146 are preferably of a size to ensure that they can be accurately operated with a gloved hand. The microcomputer housing 134 must be water tight and includes a receptacle 148 for receiving the fiber optic cable 132. It is desirable that the receptacle allow the fiber optic cable 132 to be disconnected when the embodiment of the invention is not in use but hold the fiber optic cable 132 securely when in use.

As shown best in the phantom image provided in the side view of FIG. 3B, an electrical display device 137A, which is the presently preferred example of a visual array means of the present invention, and an optical lens 137B are together generally represented at 137. As can be seen in FIGS. 3A and 3B, the electrical display device and optical lens 137 are positioned within the diver's field of view; thus, the diver is not required to divert his attention from the surrounding environment when viewing the display. The position of the electrical display device and optical device 137 can be varied so that the user's view of the surrounding environment is substantially unhindered.

The field of view electrical display device 137A, the field of view optics (lens) 137B, and any required associated structures are the presently preferred example of a means for displaying the information conveyed by a display signal generated by the microcomputer and the other signal processing circuitry. Importantly, those skilled in the art, using the teachings contained herein, will be able to fabricate many other structures which fall within the scope of the herein claimed means for displaying.

Still further, the present invention can make use of other techniques, such as projection techniques, to display the needed information to the user. Moreover, other types of display techniques, both those now known and which will become available in the future, such as semi-transparent display devices and the use of fiber optics to convey an image to the eye, can also be used within the scope of the present invention.

FIGS. 4A and 4B represent another presently preferred embodiment of the present invention. The embodiment of FIGS. 4A and 4B illustrates how the present invention can be adapted for use on an existing diving mask 152. The embodiment represented in FIGS. 4A and 4B has best application in retrofitting diving masks, which are already owned by a diver, with the benefits of the present invention. Still, the concepts represented in the embodiment of FIGS. 4A and 4B can be utilized in other specific embodiments of the present invention.

Figure 1:
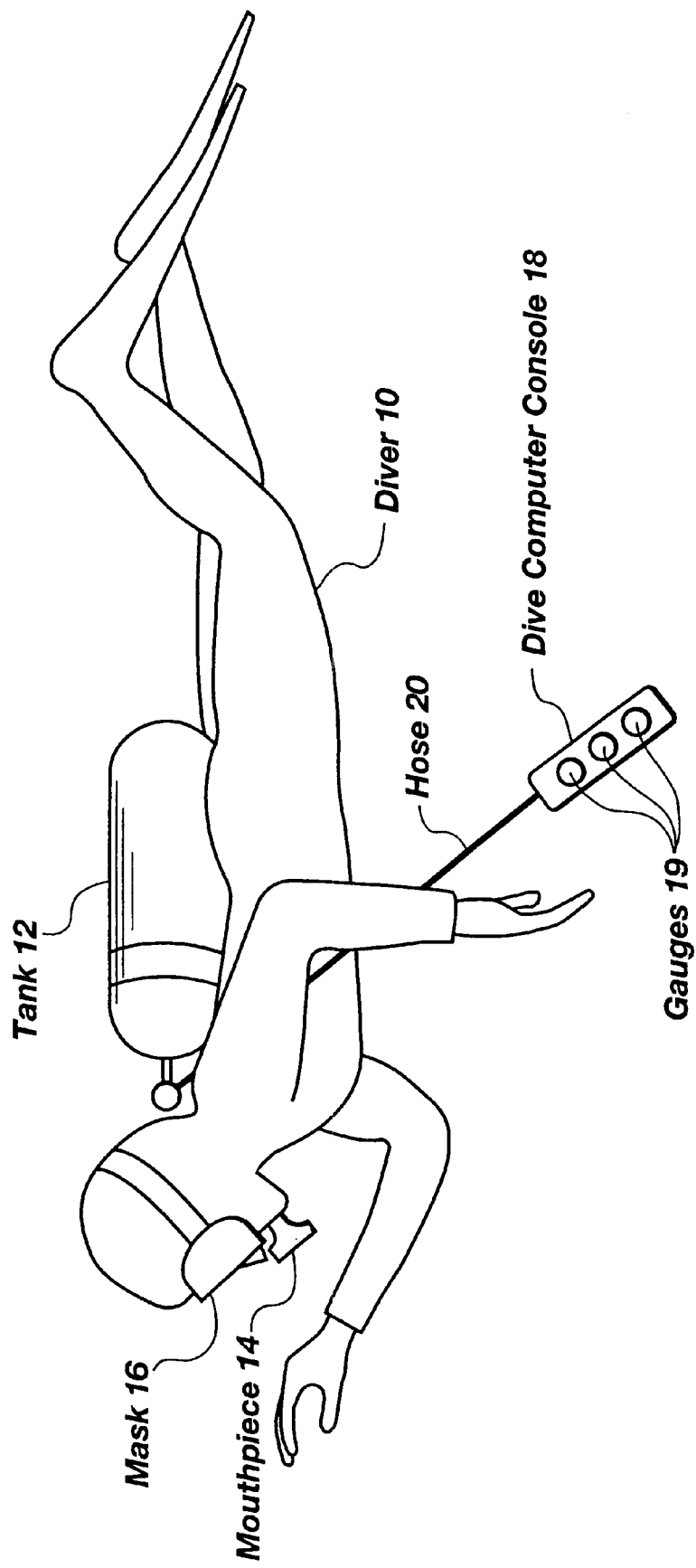
FIG. 1 is a side view of a diver using a prior art dive computer.

The diving mask 152 includes a bezel 156 which holds a mask lens 154 and a side lens 174 in place. As is customary in the art, a strap 158 holds the diving mask 152 in position on the diver's head as illustrated in FIG. 1. In order to provide a field of view display in accordance with one aspect of the present invention, a display housing 160 is attached to the front of the diving mask 152 and preferably against the mask lens 154.

On the exterior of the display housing 160 are a plurality of control switches 162 which preferably function similarly to control switches 146 (FIG. 3A). The display housing 160 can be attached to the diving mask 152 using any number of techniques known in the art according to the configuration of the diving mask 152.

Located within the display housing 160 are an electrical display device 164, which preferably is a light emitting diode display, a mirror 166, and a lens 168, all generally designated as a field of view display system at 172 in FIGS. 4A and 4B. It will be appreciated that the field of view display system 172 shown in FIGS. 4A and 4B is merely a diagrammatic representation of the electrical and optical components which will be explained later in greater detail. As in the before described embodiments, the field of view display system 172 conveys important information to the user within his field of view.

While not explicitly represented in FIGS. 4A and 4B, it will be understood that various electrical and mechanical support components will also be included in the display housing 160. A fiber optic connector 170 is also included to receive a fiber optic cable which conveys data between the sensors positioned in a sensor unit which will be described next in connection with FIG. 5. While a fiber optic cable is preferred, it is within the scope of the present invention to also utilize an electrical cable. Those skilled in the art can determine which components should be housed in the display housing 160 and which in the sensor unit.

It will be appreciated that with the use of either of the embodiments represented in FIGS. 3A–3B or 4A–4B, the user is provided with the same important advantages inherent with the present invention.

Figure 5:
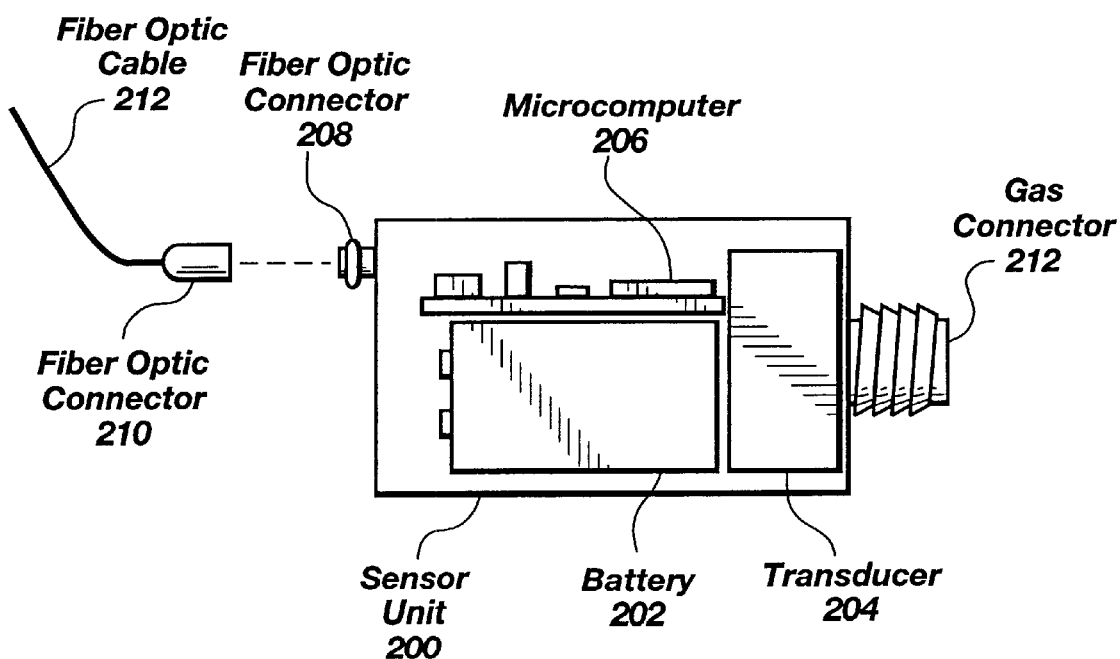
FIG. 5 is a plan view of the components mounted on a scuba air tank when the optical display illustrated in FIGS. 4A and 4B is used.

FIG. 5 is a diagrammatic representation of a sensor unit 200 which is preferably mounted on the air tank (12 in FIG. 2B) used by the diver. The sensor unit 200 preferably includes a threaded gas connector 212 which is joined directly to an appropriate fixture on the tank, or by a short hose (not represented), by which the pressure within the tank is communicated to a pressure transducer 204 which generates a signal representing the pressure within the tank. By mounting the sensor unit 200 on the air tank 12 (FIG. 2B), the need for a long high pressure hose (20 in FIG. 1) which is subject to rupture and entanglement, and the hazards presented thereby, is eliminated. The pressure transducer 204 can preferably be one available from Nova Sensor of Fremont, Calif. referred as the "PI" series of sensors which are solid state, temperature compensated, all media, precision sensors.

The sensor unit 200 also preferably includes a battery 202 which supplies electrical power for the components included therein. Other sensors, a microcomputer, and other electrical signal processing components are represented in FIG. 5 at 206. The microcomputer which is preferred for use in the described embodiments is one available from Motorola of Phoenix, Ariz. referred to as a MC68HC11E2 microcontroller unit. Complete information concerning the preferred microcontroller is available from the manufacturer from publications such as the MC68HC11 Reference Manual which is now incorporated herein by reference.

A fiber optic connector 208 is mounted on the sensor unit 200 and receives a fiber optic connector 210 provided at the end of a fiber optic cable 212. Signals from the sensor unit 200 are conveyed to the components located on the diving mask (FIGS. 3A–3B and 4A–4B) via the fiber optic cable 212. It will be appreciated that the use of a fiber optic cable 212 is inherently safer and more reliable than the use of an electrical cable and does not require water tight electrical connectors but can use fiber optic connectors (208 and 210) which are much less affected by moisture than are electrical connectors. Other structures, such as electrical cables or wireless radio frequency links, can also be used to convey the signals from the sensor unit 200. The housing for the sensor unit 200 is preferably water tight and is provided with appropriate shock absorption structures.

Referring next to Figures GA and 6B, a more detailed diagrammatic representation of the field of view display system illustrated in FIGS. 3A and 3B is provided. The representation of FIG. 6 depicts the electrical display device 137A and an optical lens 137B as one preferred arrangement for the field of view display system which is integral with the diving mask 138. In order to obtain an effective field of view system, the components thereof must be properly chosen and placed in relation to each other.

As will be appreciated by those skilled in the pertinent arts, various parameters of the field of view display system must be properly chosen. For example, as indicated at $D_2$ in FIG. 6A, the distance between the optical lens 137B (which may be a compound or multiple lens) and the electrical display device 137A and the Distance $D_1$ between the optical lens 137A and the user's eye E must be properly selected. Also, the focal length of the lens 137B should be properly selected so that the image viewed by the user's eye E can have the desired apparent focal length as well as the desired magnification of the display device 137A.

In many cases it may be advantageous to have the apparent location of the display 137A positioned at substantially optical infinity relative to the position of the eye E. Thus, with the image of the electrical display device 137A located at infinity, the user only needs to shift his eye focus very little, if at all, when changing his attention from the surrounding environment to the field of view display system. The apparent distance of the image of the electrical display device 137A from the user's eye E can be varied from infinity in order to accommodate situations where the user is engaging in close work tasks which are within several inches or feet of the eye E.

The apparent distance of the image of the electrical display device 137A can be positioned at infinity by making the distance from the eye E to the optical lens 137B ($D_1$) equal to the focal length of the optical lens 137B and also making the distance from the electrical display device 137A to the optical lens 137B ($D_2$) equal to the distance from the eye E to the optical lens 137B ($D_1$).

The magnification of the image of the electrical display device 137A is controlled by the ratio of the distance between the eye E and the optical lens 137B ($D_1$) to the distance between the optical lens 137B and the electrical display device 137A ($D_2$). In order to keep the display housing 136 as small as possible and to present as much useful information as possible to the user, the display device 137A is also relatively small resulting in the characters presented on the display device being relatively small. Thus, it will generally be beneficial to magnify the image of the electrical display device 137A in the range from about 10 percent to about 250 percent.

Figure 6A:
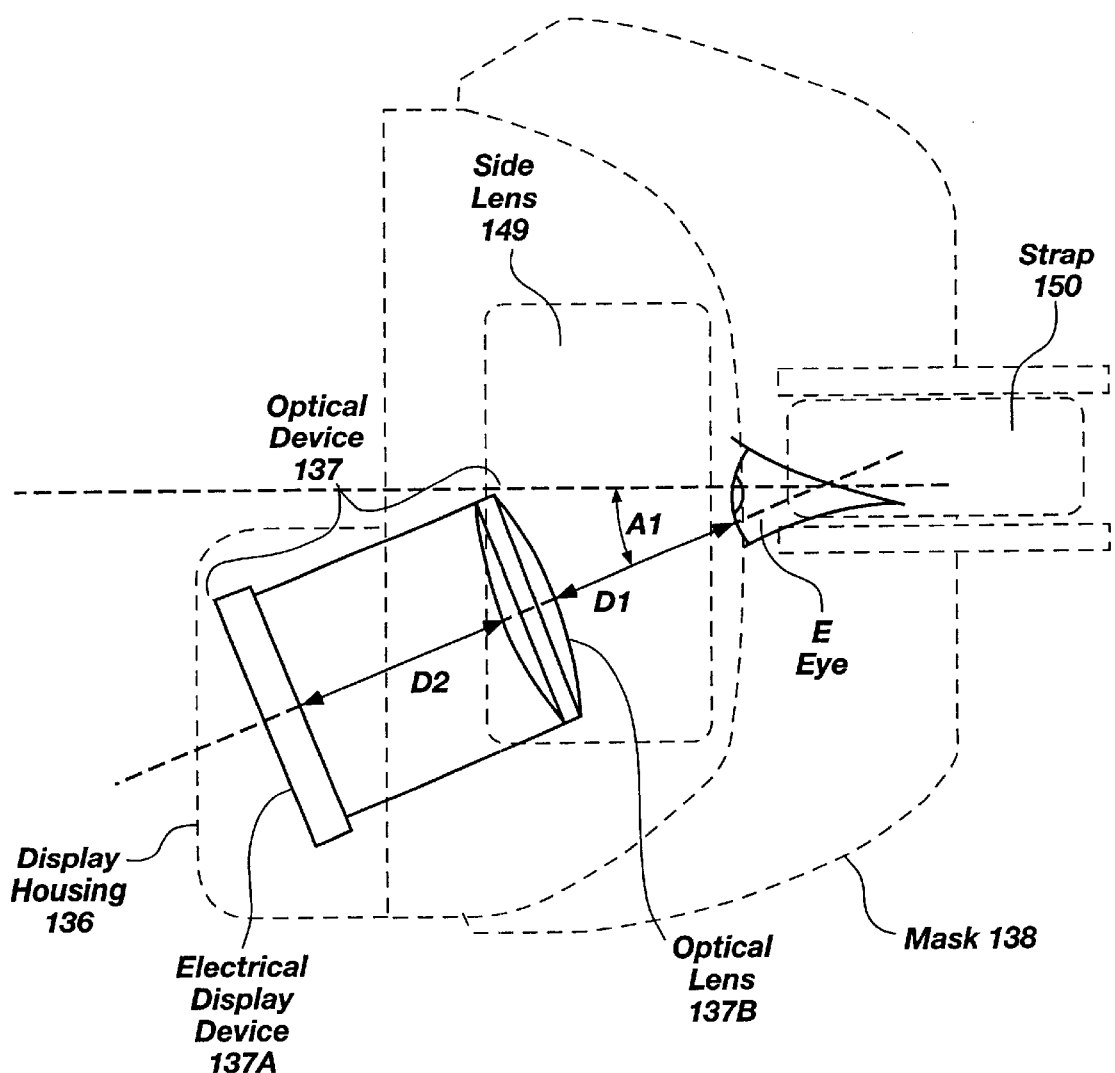
FIGS. 6A and 6B are side and top views respectively of the optical display included in the embodiment illustrated in FIGS. 3A and 3B.

The magnification M of the image of the electrical display device 137A represented in FIG. 6A is given by equation (1).

$$M = \frac{D_1}{D_2} \tag{1}$$

In the preferred embodiment represented in FIG. 6A, the distance ($D_2$) from the optical lens 137B to the electrical display device 137A is set at the focal length of the optical lens 137B, and the distance ($D_1$) from the optical lens 17B to the eye E is adjusted to the desired apparent focus distance and magnification of the image of the display device 137A.

Equation (2) is useful in making the necessary calculations and adjustments of the field of view display system in the embodiments of the present invention.

$$\frac{1}{FL} = \frac{1}{D_1} + \frac{1}{D_2} \tag{2}$$

where FL equals the optical lens focal length and $D_1$ and $D_2$ are as previously defined. If $D_2$ equals FL then $D_1$ is infinity and the image appears to the viewer as if it originated at infinity.

As mentioned previously, this arrangement accomplishes one of the objects of the present invention; allowing the user to read the image of the display without the need to refocus his eyes and/or allows both the surrounding environment and the image of the display to be viewed in focus simultaneously. Since the image of the electrical display device can be positioned so that it is always at least within the user's peripheral vision, the display device can be used to alert the user when a hazardous condition is detected, e.g., by flashing the display, even when the user's attention is directed to the surrounding environment. This is a great improvement over previously available apparatus where the user must make a conscious effort to view any display which was providing important information. Moreover, in order to increase the safety of the user, aural signals can also be used to warn of a condition requiring the user's attention.

Two angles, $A_1$ (FIG. 6A) and $A_2$ (FIG. 6B), should be considered when fabricating some of the illustrated embodiments of the present invention. Angle $A_1$ is the vertical angle which the eye E moves through when changing from a position looking directly ahead to a position looking directly into the optical lens 137B. Angle $A_2$ is the horizontal angle which the eye E moves through when changing from a position looking straight ahead to a position looking directly into the optical lens 137B.

By varying Angle $A_1$ and Angle $A_2$, the location of the field of view display system can conceivably be located anywhere in front of the eye. The preferred embodiments of the invention utilize the physiology of the eye socket (not represented) and the structural features of the user's face which allow the eye E to more easily look down and to the outside rather than looking up and to the inside. By placing the display system of the embodiments below and to the outside of the eye E, it is still possible to obtain a substantially unobstructed view through the mask lens while the image of the electrical display device remains in the field of view.

Figure 6B:
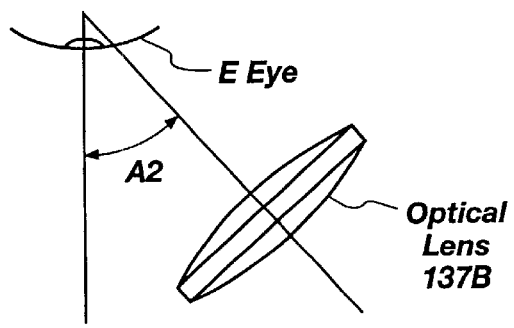

With the arrangement illustrated in FIGS. 6A and 6B, the central portion of the user's field of view has not been diminished by the placement of the field of view display system. The field of view display system can be preferably positioned on the right side of the mask, on the left side of the mask, or a field of view display system can be positioned on both the left and the right sides, one for each eye. When the present invention is being used to convey information to an underwater scuba diver, it is preferred to place the display system on the left side because it is customary to connect the scuba second stage regulator mouthpiece to the air tank via a high pressure hose on the divers right side.

It should be understood that it is possible to mount the display system anywhere in or on the mask or in front of the mask. The heretofore illustrated embodiments merely depict the preferred location with regard to the average physiology of the eye, eye socket, and facial features as well as minimizing restriction of the view directly out the mask when the diver is not observing the field of view display. It is also within the scope of the present invention to provide structures to adjust the position and the optical characteristics of the display system so that the image is easily viewed by different users each having a variety of, for example, facial features, sizes, shapes, and different eyeglass prescriptions.

Figure 7:
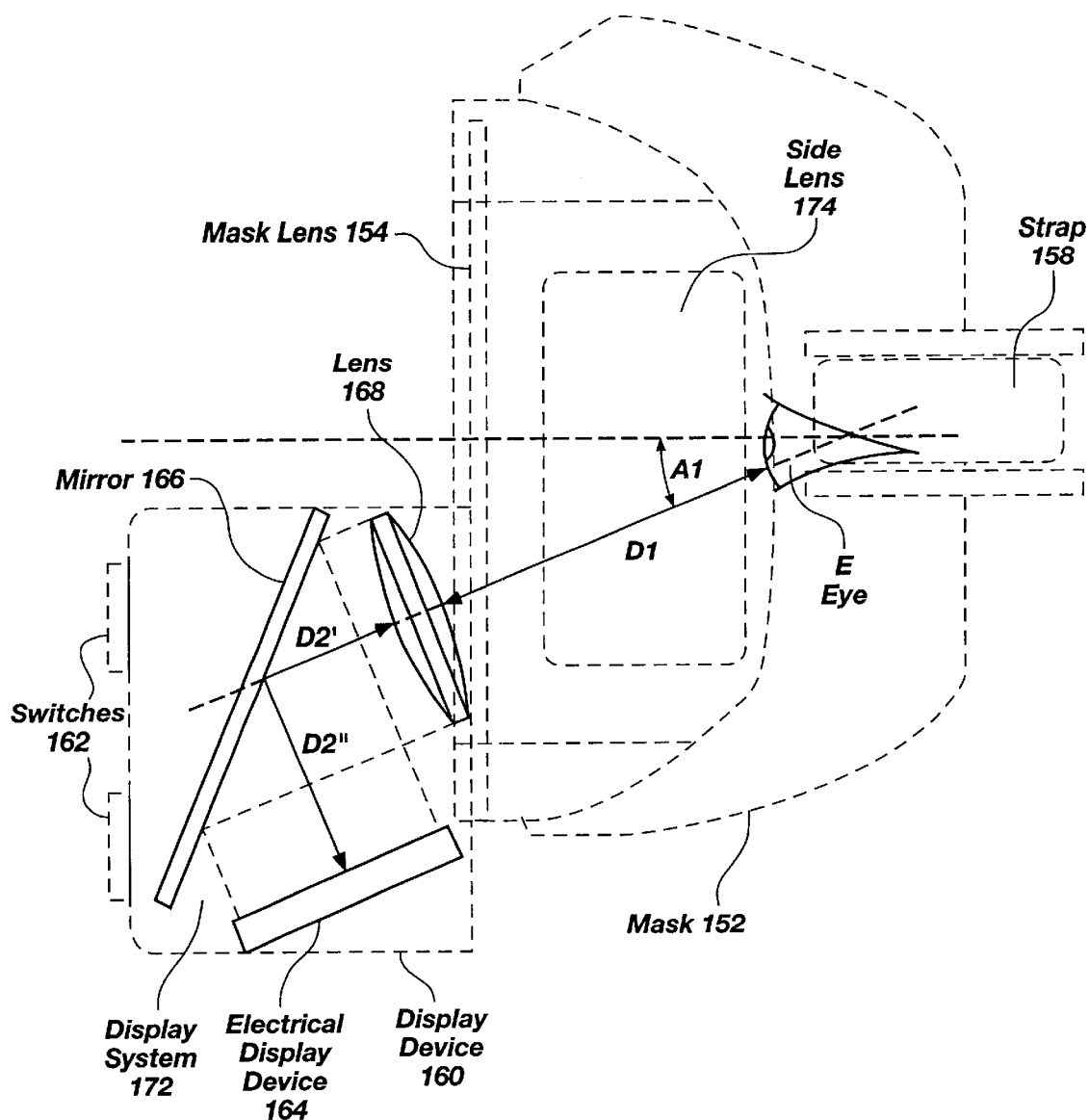
FIG. 7 is a side view of the optical display included in the embodiment illustrated in FIGS. 4A and 4B.

Referring next to FIG. 7, a more detailed diagrammatic representation of the field of view display system illustrated in FIGS. 4A and 4B is provided. The representation of FIG. 7 depicts the display device 160, a mirror 166, and a lens 168, all generally designated as a field of view display system at 172. It is to be understood that other components, such as a prism in place of mirror 166, can also be used within the scope of the present invention. As indicated earlier, the components represented in FIG. 7 are used to retrofit an existing scuba diving mask 152 with one preferred embodiment of the present invention. Because they are intended to retrofit an existing scuba mask, particular considerations must be addressed. Still, the of the same objects are achieved as with the other embodiments of the invention described herein.

In contrast to the display system represented in FIGS. 6A and 6B, when retrofitting an existing diving mask 152 with the present invention, the distance from the eye E to the display device 164 is greater than in the embodiment of FIGS. 6A and 6B. In FIG. 7, this characteristic is shown by the increase in the Distance $D_1$. Thus, it is necessary to increase the distance from the lens 168 to the display device 164 by a like amount as represented by the Distance $D_2$ (comprising $D_2'$ and $D_2''$).

In order to keep the display housing 160 a compact size, the Distance $D_2$ is folded by reflecting the light path from off the mirror 166. It will be appreciated that with the use of the reflected light path diagrammatically illustrated in FIG. 7, the dimensions of the display housing 160 are such that the display housing 160 remains compact. It is within the scope of the present invention to utilize other optical components which are now known in the art, or which become available in the future, to carry out the functions of the components represented in FIG. 7. For example, it is within the scope of the present invention to utilize fiber optics, or other technique, to convey an image to the eye E. Furthermore, as will be described in detail shortly, it is within the scope of the present invention to utilize holographic techniques to convey information to the user.

The use of the mirror 166, or other reflecting surface, in the embodiment of FIG. 7 may cause the image of the display device 164 to be reversed and/or inverted. This reversal of the image can be readily resolved by properly driving the display device 164 so that the image presented to the user is correctly oriented. Also, the before described equations that govern the location of the image, as well as the magnification of the image, apply with the embodiment of FIG. 7.

It will be appreciated that embodiments of the present invention can be integrated into, or retrofit onto, many different types and styles of masks, both those used underwater and those used on land.

Figure 8:
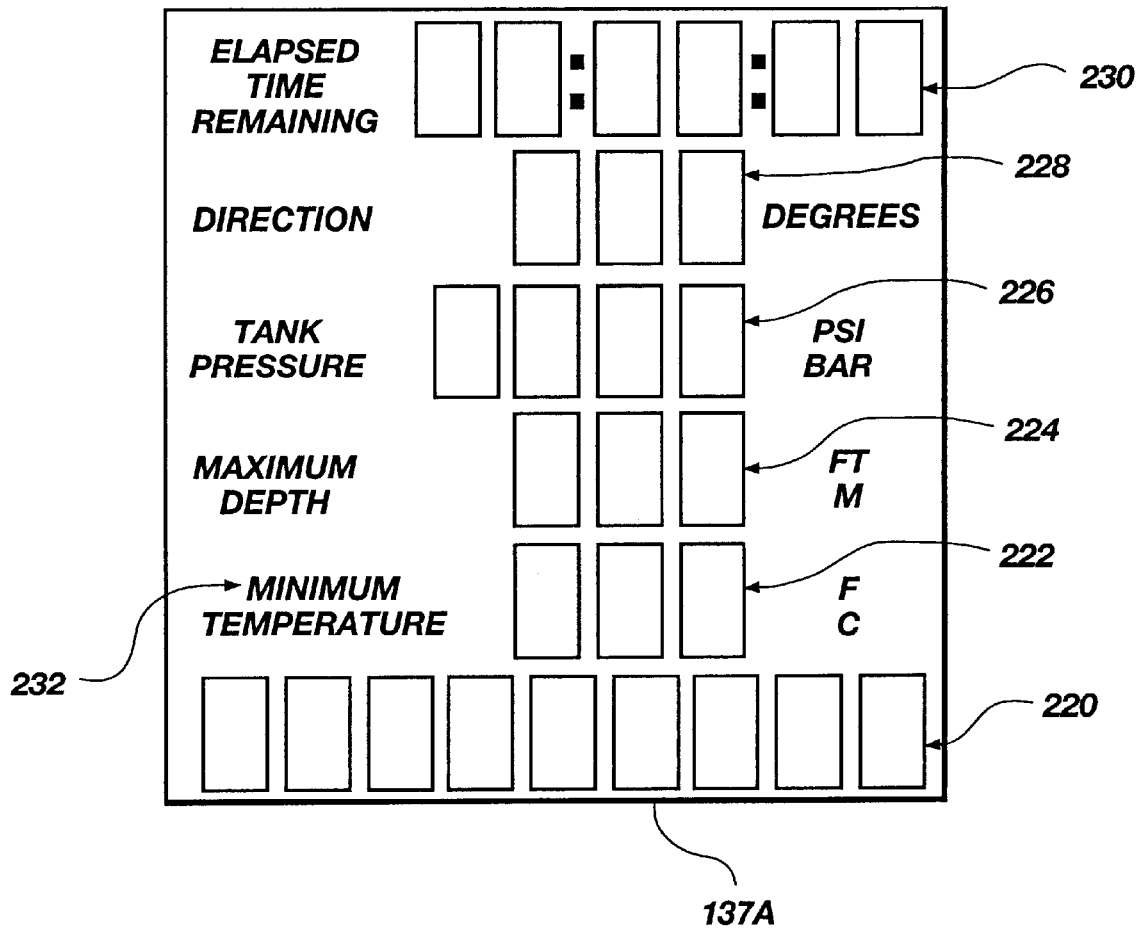
FIG. 8 illustrates one preferred arrangement of a visual device included in the display devices illustrated in FIGS. 6A, 6B, and 7.

FIG. 8 provides a front view of a representative embodiment of the electrical display device 137A illustrated in earlier figures. The display device can be based upon any one of a number of already available technologies or on those to be developed in the future. It is presently preferred that the display device 137A utilize light emitting diode technology so that the characters on the display are easily readable when the surrounding environment is dark.

The arrangement represented in FIG. 8 is one preferred design for conveying information to the user representing the variables and calculations from the microcomputer. The represented display device 137A preferably includes a visual array of characters arranged in marquis fashion, generally indicated at 220, whereupon alpha-numeric characters can be scrolled across the field of view of the user. Also represented in FIG. 8 are other character groups including: a minimum temperature/temperature array (including three characters generally indicated at 222) which can toggle between fahrenheit/centigrade; a maximum depth/current depth array (including three characters generally indicated at 224) which can toggle between feet/meters; a tank pressure array (including four characters generally indicated at 226) which can toggle between pounds per square inch(psi)/bar; a direction array (including three characters generally indicated at 228) which indicates the degrees from north the user is currently oriented; and, an elapsed time/time of day/time remaining array (including six characters generally indicated at 230).

In the case of the multi-purpose arrays, e.g., minimum temperature/temperature array 222, the operating icon is toggled to inform the user what information is being displayed, for example, the minimum temperature which has been encountered during the dive or merely the current temperature. In some cases, the minimum temperature/temperature array 222, the maximum depth/current depth array 224, and the tank pressure array 226, can be toggled between metric or english units. The marquis array 220 is provided for the microcomputer and associated components to present messages regarding, for example, alarm conditions or other calculated variables such as the amount of decompression time remaining, decompression stop levels, or other useful information.

The elapsed time/time remaining array 230 can be toggled between displaying the time of day, the elapsed time of the dive, or a calculated time representing the estimated time remaining in the dive which takes into account the air remaining in the tank as well as decompression factors. It will be appreciated that the embodiments of the present invention, using the information gathered by the sensors described herein, can calculate critical decompression information in accordance with any number of algorithms or data tables which are available in the art. For example, useful information can be obtained from the publications A. A. Buhlmann, *Decompression/Decompression Sickness*

(published by Springer-Verlag 1984) and P. B. Bennett, et al., *The Physiology and Medicine of Diving and Compressed Air Work* (published by Williams and Williams Co. 1969) which are also now incorporated herein by reference. Those skilled in the pertinent arts will readily be able to incorporate the necessary programming steps and/or hardware into embodiments of the present invention to utilize any one of a number of decompression calculations schemes.

The present invention preferably includes a means for timing an elapsed time of a dive, a means for calculating a safe assent rate, both of which can desirably be programmed into the microcomputer, and a means for displaying a safe assent rate within the diver's field of view so as to aid the diver in making safe, yet as long and as deep as possible, dives.

The direction array 228 represented in FIG. 8 shows the current compass heading of the user. Many users of the present invention regularly work under environmental conditions where they can readily become disoriented. Thus, being provided with a compass heading, showing horizontal orientation, is a great convenience and safety feature, and in the case of an underwater diver, providing a vertical orientation indicator (not represented in the figures) can also be desirable.

Figure 9A:
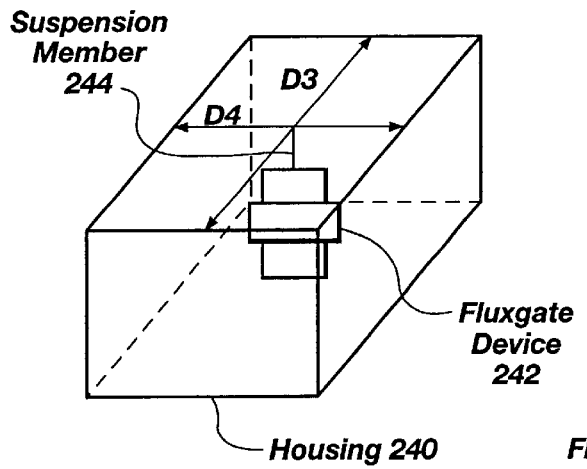
FIGS. 9A, 9B, and 9C are perspective, side, and front views, respectively, of a compass device preferably included in the embodiments of the present invention.
Figure 9B:
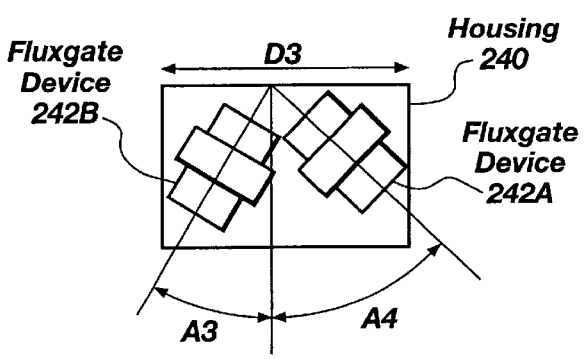
Figure 9C:
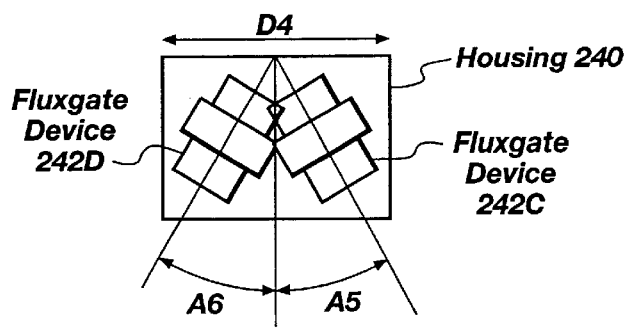
Figure 10A:
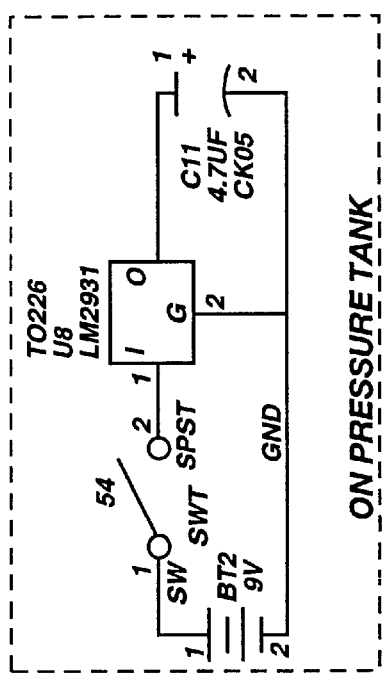
FIG. 10 is a detailed schematic diagram showing one preferred arrangement for the electrical components of the present invention.
Figure 10B:
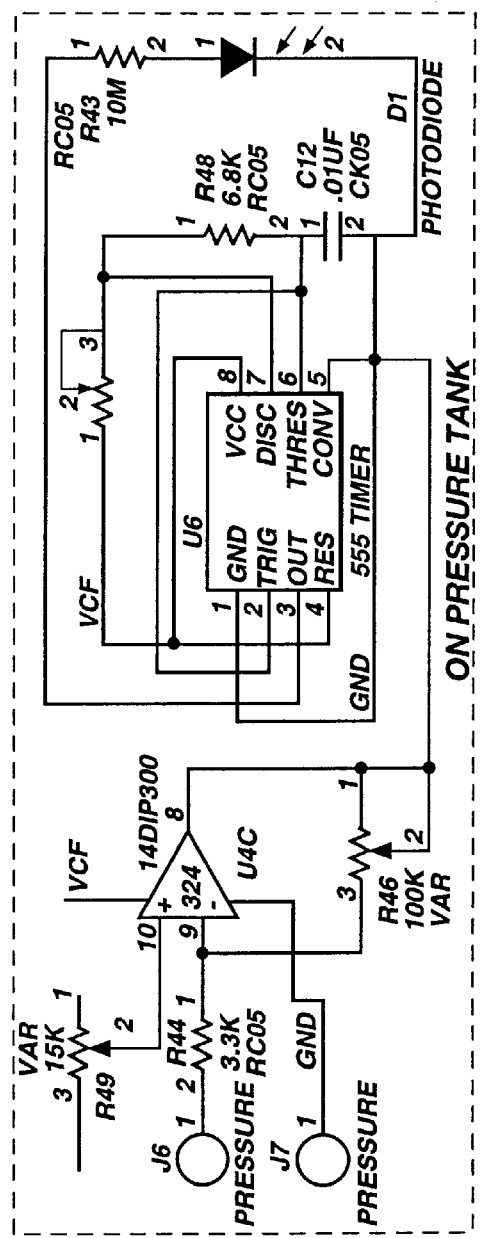
Figure 10C:
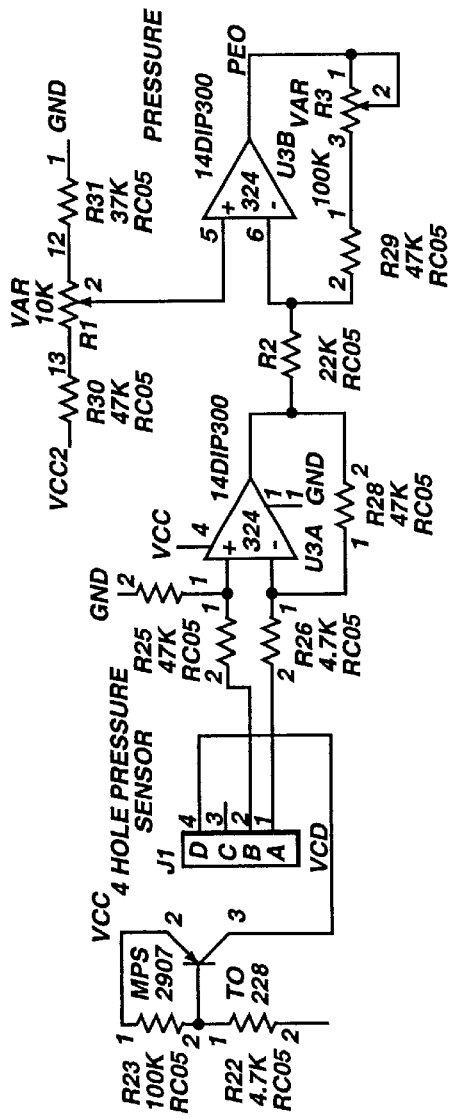
Figure 10D:
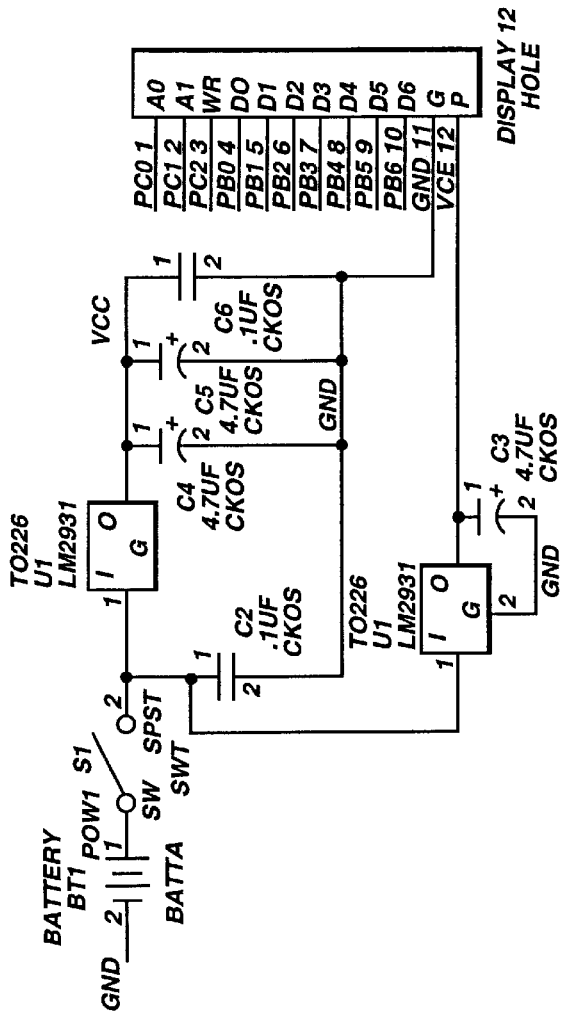
Figure 10E:
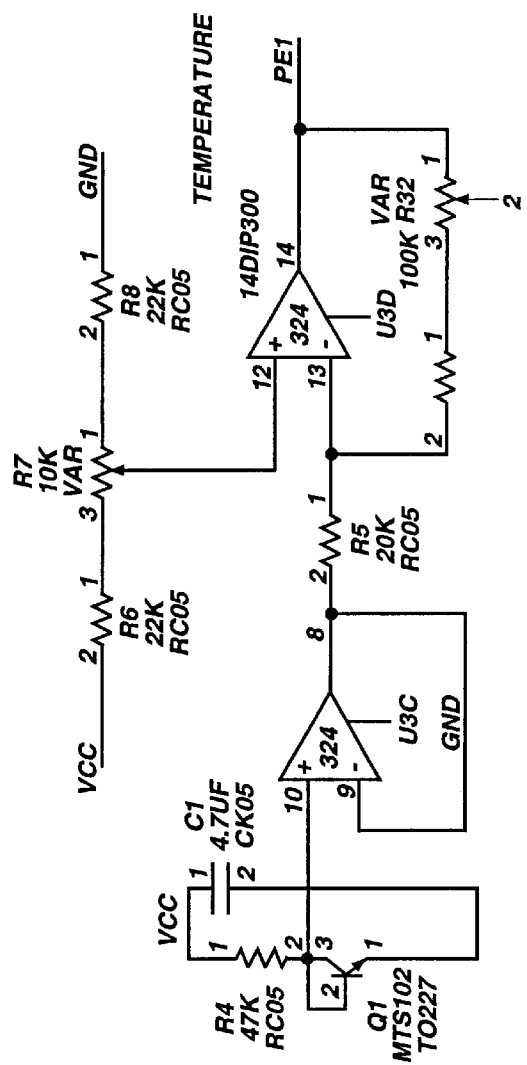
Figure 10F:
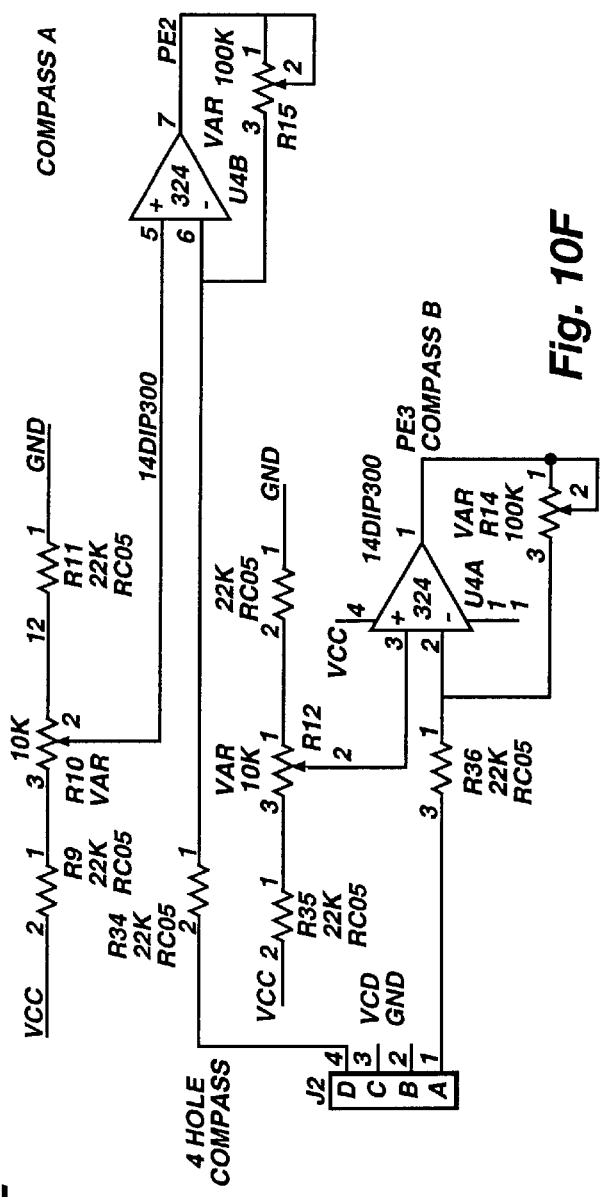
Figure 10G:
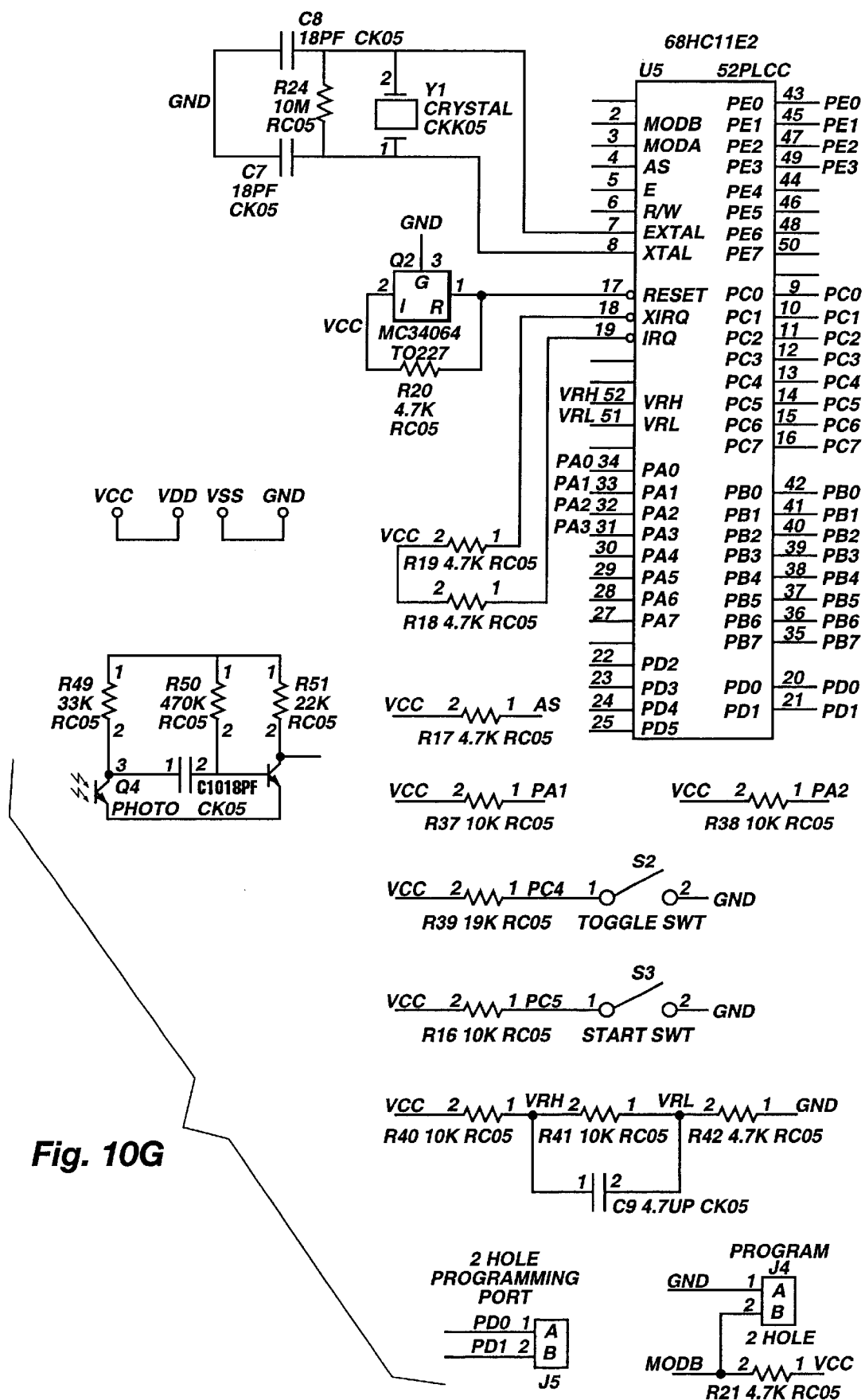

FIGS. 9A–9C diagrammatically depict the compass sensor which provides the compass heading data and which is the presently preferred embodiment of the compass sensor 108 represented in FIG. 2. Since the user, and particularly an underwater diver, will regularly position himself in a non-vertical orientation, the device used to determine the compass heading must be allowed to accurately operate when the diver orients his body so that the device is moved from a horizontal position.

In the preferred embodiment, a fluxgate device 242 is used as the compass sensor. It is to be understood that other devices can also be used within the scope of the present invention to detect changes in the relative orientation of the earth's magnetic field. The fluxgate device 242 operates by sensing changes in the earth's magnetic field as the relative orientation of the device changes. The fluxgate compass sensor is preferably one available from Dinsmore Instrument Company, Part no. 1525. In order to keep the fluxgate device 242 in a substantially horizontal orientation regardless of the orientation of the user, the fluxgate device 242 is suspended from a suspension member 244 within a housing 240. The suspension member 244 preferably is arranged so that the fluxgate device 242 will only be allowed to swivel and not rotate. It will be understood that if the fluxgate device 242 rotates with respect to the housing 240 (which is fixed to the user in some fashion) then inaccuracies will be introduced into the compass reading.

The housing 240 preferably comprises a small liquid-tight container which is filled with a dielectric solution. The suspension member 244 suspends the fluxgate device 242 in the dielectric fluid so that a substantially horizontal orientation is maintained as the user changes his orientation. The dielectric solution further provides a dampening effect against transient movements of the housing 240 so that the output does not rapidly change when small momentary movements are made. The dielectric solution is preferably one of the perfluorinated fluids available in the art which have the appropriate viscosity, density, and other desirable characteristics. Most preferable is one of the family of fluorinert liquids available from Minnesota Mining and Manufacturing Co. (3M).

FIG. 9A will be referenced next. FIG. 9A illustrates two of the dimensions, $D_3$ and $D_4$, of the housing 240. It is to be understood that the housing 240 can be any one of a number of different shapes in addition to the rectangular shape illustrated in FIG. 9A. Since the orientation of a scuba diver is not vertical much of the time, the housing 240 can be fixed in an orientation such that it is substantially horizontal when the diver is in the most common orientation. The front-back Dimension $D_3$ of the housing 240 can preferably be longer than the side-side Dimension $D_4$ in order to accommodate the more common changes of orientation by the user/diver along the axis defined by Dimension D3.

FIG. 9B provides a side view of the housing 240 along Dimension $D_3$ showing the position of the fluxgate device (at 242A) oriented at a first front-back Angle $A_4$ and the fluxgate device (at 242B) in a second front-back Angle $A_3$. FIG. 9C provides an end view of the housing 240 along Dimension $D_4$ showing the position of the fluxgate device (at 242C) oriented in a first side-side Angle $A_5$ and the fluxgate device (at 242D) in a second side-side Angle $A_6$.

It will be appreciated that other structures can be used within the scope of the present invention to provide a compass function. Such structures can include hardware and/or software to provide accurate compass headings regardless of the diver's orientation and without structures being used to keep a compass device in a plumb alignment. Those skilled in is the art will understand that other structures can also be used to carry out the above-described functions using the teachings contained herein.

FIG. 10 provides a detailed schematic diagram of the electrical components of the presently preferred embodiment of the present invention. In order to increase the clarity of the diagram of FIG. 10, the reference designations customarily used in the art in such diagrams have been retained. Table A, below, provides a description of the components represented in FIG. 10. It is to be appreciated that the arrangement represented in FIG. 10 is merely exemplary and the present invention can be embodied in many alternative forms which can be arrived at using the teachings contained herein.

TABLE A

| Reference Designation | Part |
|---|---|
| BT1 | BATTERY >5 V |
| BT2 | BATTERY >5 V |
| C1, C3, C4, C9, C11 | 4.7 UF |
| C2, C6 | 0.1 UF |
| C5 | 4.7 |
| C7, C8, C10 | 18 PF |
| C12 | 0.01 UF |
| D1 | PHOTODIODE, OP77, TRW |
| J1 | PRESSURE SENSOR FOR DEPTH, MODEL FPB-04A, FUJIKURA |
| J2 | COMPASS - DINSMORE INSTRUMENT COMP., PART NO. 1525 |
| J3 | DISPLAY - HEWLETT PACKARD, HPDL 1414 |
| J4 | PROGRAM - JUMPER TO DOWN-LOAD A NEW PROGRAM |
| J5 | PROGRAMMING PORT |
| J6, J7 | PRESSURE TRANSDUCER FOR TANK, NOVA SENSOR, NPI-15B-173SH |
| Q1 | MTS102 - MOTOROLA - TEMPERATURE SENSOR |
| Q2 | MC34064 - MOTOROLA |
| Q3 | 2N2907 - GENERIC |
| Q4 | LED, HIGH EFFICIENCY, 2 CANDELA, PANASONIC LNG1CAL(UR) OR HEWLETT PACKARD - 3950 |

TABLE A-continued

| Reference Designation | Part |
| --- | --- |
| Q5 | 2N2222 |
| R1, R7, R10, R12, R16, R37, R38, R39, R40, R41, R47 | 10K |
| R2, R6, R8, R9, R11, R13, R34, R35, R36, R51 | 22K |
| R3, R14, R15, R23, R32, R33, R46 | 100K |
| R4, R25, R26, R27, R28, R29, R30 | 47K |
| R5 | 20K |
| R17, R18, R19, R20, R21, R22 R42 | 4.7K |
| R24, R43 | 10M |
| R31 | 37K |
| R44 | 3.3K |
| R45 | 15K |
| R48 | 6.8K |
| R49 | 33K |
| R50 | 470K |
| S1, S4 | SW SPST |
| S2 | MOMENTARY CLOSURE (TOGGLE) SWITCH |
| S3 | MOMENTARY CLOSURE START/STOP SWITCH |
| U1, U2, U8 | LM2931 NATIONAL SEMI-CONDUCTOR |
| U3, U4 | 324 NATIONAL SEMICONDUCTOR |
| U5 | 68HC11E2 MOTOROLA |
| U6, U7 | 555 TIMER GENERIC |
| Y1 | CRYSTAL, 8 MHZ GENERIC |
| FIBER OPTIC CABLE | AMP, TYPE 501232-1 |
| FIBER OPTIC CONNECTORS | RG59 COAX CONNECTORS WITH CABLE EPOXIED IN PLACE |
| LENS | 25 mm DIAMETER, FL = 25–40 mm |

Figure 11:
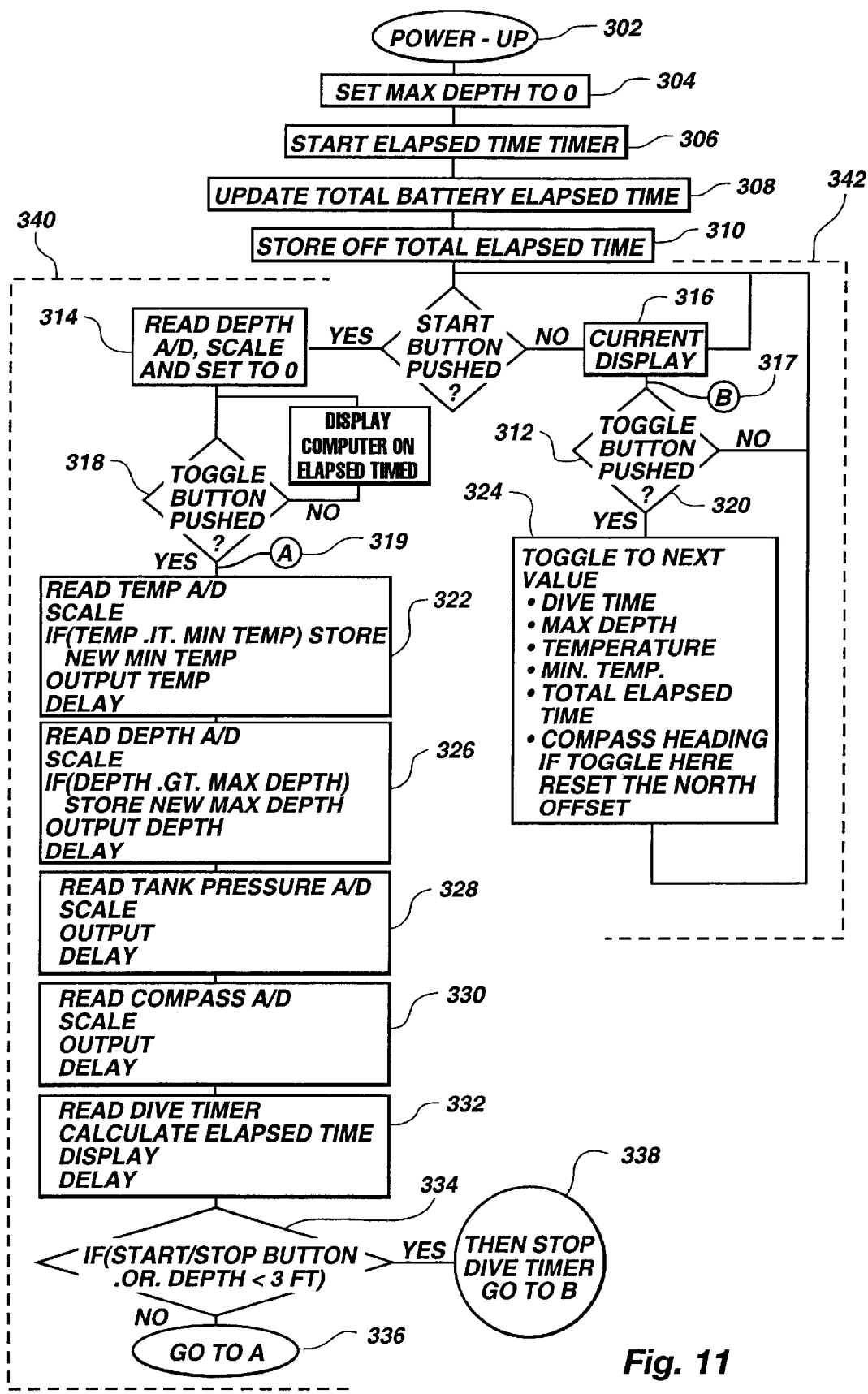
FIG. 11 is a flow chart representing the steps carried out by the described embodiments of the present invention.

Reference will next be made to FIG. 11 which is a flow chart representing the steps carried out by the embodiments of the present invention described herein being used by a scuba diver. While the scuba diving environment is the preferred application for the present invention, the present invention can also be used in many other applications such as those previously mentioned. It is to be understood that the steps set forth in the flow chart of FIG. 11 are merely representative of those which can be used to carry out the present invention, whether using the hardware herein described or other arrangements of components, either those presently available or which become available in the future.

Furthermore, the presently preferred example of programming code used to substantially implement the steps set forth in the flow chart of FIG. 11 is reproduced in the Programming Code Appendix attached hereto. The code contained in the Appendix is merely an example of an arrangement which can be used to operate the components embodying the present invention.

The preferred embodiments of the present invention possess two modes of operation: a "dormant mode" and a "dive-in-progress mode." The dormant mode is in effect when the diver is not engaged in an actual dive but the embodiment of the invention is powered up. The dive-in-progress mode is in effect when an actual dive is underway. The described embodiments are arranged so that the user is presented with the most advantageous combination of controls allowing flexibility and ease of use. Both ergonomics and ease of understanding should be given appropriate consideration when selecting how the user will interface with the input devices on the embodiment.

In the described preferred embodiments, three switch functions are needed for control of the embodiment. The switch functions can be carried out either by a single switch or by a plurality of manually actuated switches such as those represented in FIGS. 3A–3B at 146 and in FIGS. 4A–4B at 162. For example, in the steps described in the flow chart of FIG. 11, one switch is preferably a single-pole, single-throw (SPST) switch that causes the embodiment to turn on and off (power up and down). Second and third switches are momentary closure switches. The second switch is referred to as the start/stop switch and is actuated to signal the beginning or end of a dive or to perform some other function(s) as will be hereinafter explained. The third switch, preferably referred to as a display control switch, is actuated by the user to change parameters shown in the field of view display system hereinbefore described.

The start/stop switch is used to mark the time that a dive is begun or ended. If, after the embodiment is powered up, the start/stop switch is not actuated, then the system does not enter the dive-in-progress mode but remains in the dormant mode. Once the start/stop switch is actuated the user can scroll between the various embodiment and dive variables on the field of view display system and the embodiment is ready to enter the dive-in-progress mode.

The start/stop switch is actuated when a diver is ready to begin a dive. The embodiment of the present invention then monitors the depth of the diver under the surface of the water and transfers to the dive-in-progress mode once the depth is determined to be greater than a predetermine depth, for example, three feet. The dive-in-progress mode continues until the start/stop switch is pressed again or the depth is sensed to again be less than three feet. At this point the dormant mode is again entered. It will be appreciated that the embodiments of the present invention can be configured to eliminate the step of pressing the start/stop switch and enter the dive-in-progress mode and the dormant mode when appropriate depths are sensed.

Having explained the two modes of operation of the described embodiments of the present invention, further details will next be provided on the presently preferred steps carried out by the described embodiment by continued reference to FIG. 11.

Beginning at step 302, an on/off switch is actuated causing power to be applied to the embodiment's components. When power is applied, a startup routine is automatically invoked, the startup routine including initializing the required registers and system variables in the microcomputer (112 in FIG. 2A) and: (1) zeroing the maximum depth variable (step 304); (2) zeroing the elapsed time variable since the embodiment was last powered up and starting the elapsed time timer (step 306); (3) zeroing the dive elapsed time variable (5) zeroing the compass offset; and (6) setting the minimum temperature variable to a large value. The elapsed time since last power up is added to a cumulative total of the embodiment's powered up time and is stored in nonvolatile electrically erasable memory. This cumulative total of the embodiment's powered up time can be viewed while in the dormant mode as is described below. The off total elapsed time is also stored (step 310).

After the startup routine is completed, the embodiment checks to see if the start/stop switch has been actuated (step 312) and if not, then the embodiment begins operation in the dormant mode and the current display (step 316) shows a dive time of zero since the embodiment has just been powered up and no dive has taken place yet. When the on/off switch is set to off, the only variable that is not lost is the elapsed time since the embodiment was last powered up.

The dormant mode is entered after the embodiment is powered up or after the end of a dive. As explained, the end of a dive is marked either by the diver actuating the start/stop switch while in the dive-in-progress mode or the sensed depth decreasing to a level less than three feet. Once in the dormant mode the system displays the dive elapsed time and allows the user to toggle the display between other system parameters and historical dive information.

In the presently preferred arrangement set forth in FIG. 11, rather than the display device represented in FIG. 8, a single line alpha-numeric display device is used across which a plurality of variables and information can conveyed to the diver as indicated at step 324. The diver actuates the display control switch (a momentary on switch) to toggle between the following exemplary values: (1) last dive elapsed time; (2) the maximum depth of the last dive; (3) the current temperature; (4) the minimum temperature during the last dive; (5) the total elapsed time that the microcomputer has been powered up; and, (6) the compass heading.

While in the dormant mode, the variable which is displayed within the diver's field of view remains unchanged until the diver toggles the display control switch again (step 320). Toggling the display control switch allows the diver to scroll the value of the next available variable across the display. If the display control (toggle) switch (button) is not pushed, control returns to step 312.

Additionally, while in the dormant mode the compass heading can be zeroed. The compass heading can be zeroed if desired since, when the embodiment is powered up, the compass sensor has no reference to any heading. Upon power up, the compass sensor arbitrarily establishes a zero degree heading and then reports changes in orientation relative to the zero degree heading. In the described embodiment, by actuating the start/stop switch when the compass heading is being displayed, whichever direction the compass sensor is oriented becomes the zero heading.

Desirably, the compass heading is zeroed at magnetic north, or true north, depending upon the preference of the user. To do this, the compass sensor is oriented in a north-south direction, compared to an independent reference magnetic compass such as a hand held compass, and then pressing the start/stop switch. This zeros the compass heading as described and also puts the system in the dive-in-progress mode. To return to the dormant mode the start/stop switch is pressed once again.

With continued reference to FIG. 11, the dive-in-progress mode will be explained in detail next. The steps carried out during the dive-in-progress mode are indicated by the dashed bracket 340. The steps carried out during the dormant mode are indicated by the dashed bracket 342. As will now be appreciated, the dive-in-progress mode is entered only when a combination of a manual and automatic actions are taken. First, the diver must mark the start of a dive by pressing the start/stop switch as indicated by the "yes" branch of step 312.

Next, as indicated at step 314, the microcomputer automatically reads the depth sensor and sets the current reading to zero depth and then, as indicated at step 318, waits for the dive depth to be greater than three feet. Alternatively, actuating the start/stop switch again will return the embodiment to the dormant mode. While waiting for the actual dive to begin (defined by the sensed depth being greater than three feet), the elapsed time in minutes since the embodiment was powered up is displayed.

Once the depth is determined to be greater than three feet, represented at Point A 319, the microcomputer reads and displays the following system and dive variables as set forth by the subroutines represented in steps 322–332:

(1) current temperature (represented at 322 in FIG. 11);
(2) current dive depth (represented at 326 in FIG. 11);
(3) tank pressure (represented at 328 in FIG. 11);
(4) compass heading (represented at 330 in FIG. 11);
(5) dive elapsed time (represented at 332 in FIG. 11).

Each variable is preferably automatically displayed for three seconds on the display before the next variable is scrolled into the diver's field of view. By actuating the display control switch at any time while in the dive-in-progress mode, the currently displayed variable is held on the display, or if a variable is already held on the display, pressing the display control switch again starts the variables scrolling on the display again.

As indicated at step 334, the variables are continued to be scrolled across the display until either the start/stop switch is actuated or the sensed depth is reduced to less than three feet. If the start/stop switch is actuated or the sensed depth is reduced to less than three feet, the dive timer is stopped (as indicated at 338) and control moves to point B 317 in the flow chart of FIG. 11. If neither the start/stop switch is actuated nor the sensed depth is greater than three feet, control transfers back to point A 319 in the flow chart of FIG. 11. Once the dive has begun then the variables automatically scroll within the diver's field of view so that the diver can continually be made aware of all of the system and dive variables. It will be appreciated that the embodiments of the present invention provide a diver with important information in a manner which is more convenient and efficient, thus leading to safer diving conditions, than previously available.

It will be further appreciated that the microcomputer of the described embodiment can readily carry out calculations to determine necessary decompression steps for a diver utilizing any number of available decompression schemes. Information on useful decompression schemes is available in the earlier referenced publications and in the publications referenced in U.S. Pat. No. 4,882,678, cols. 1–2, which are now incorporated herein by reference. Using the teachings contained herein, those skilled in the art will readily be able to incorporate such decompression schemes into embodiments of the present invention so as to convey such needed information to the diver.

Figure 12A:
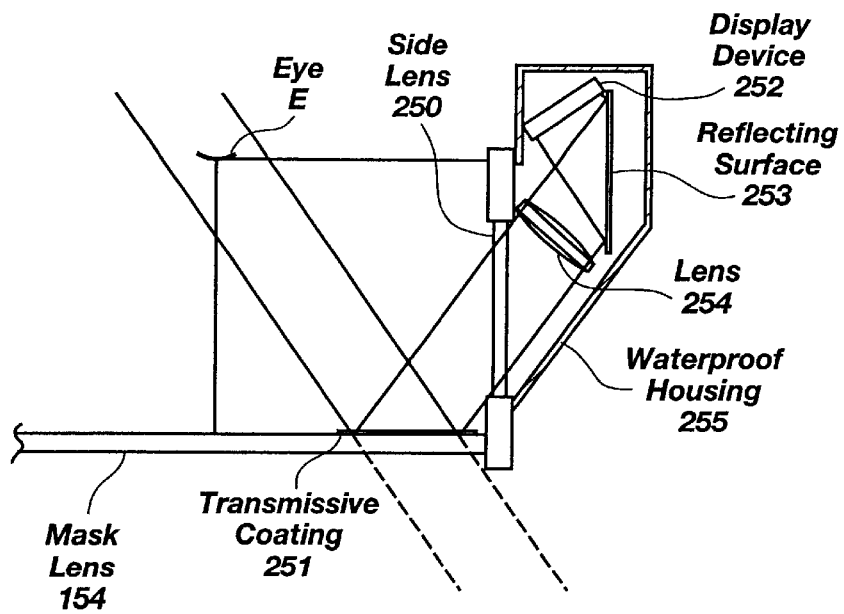
FIG. 12A illustrates another embodiment of the present invention by way of a top cross sectional view taken horizontally through a diving mask front and side lens with additional structures for projecting and superimposing the display data onto the front lens of the mask and onto the diver's field of view.

Reference will next be made to FIG. 12A which is a top cross sectional view taken horizontally through a portion of a diving mask having another embodiment of the present invention incorporated therein. The embodiments of the present invention represented in FIGS. 12A–12C and 13A–13C allow information to be superimposed upon the field of view of the diver. Thus, with the teachings of the present invention as disclosed herein, the displayed information can alternatively be opaquely presently within the user's field of view or transparently superimposed upon the user's field of view.

FIG. 12A illustrates another embodiment of the invention that utilizes and a portion of a diving mask which includes a front lens 154 and a side lens 250. The front lens 154 functions as an active component of the field of view optical system and in the embodiment of FIG. 12A, the display information will be transparently superimposed upon the user's field of view.

In the embodiment of FIG. 12A, a waterproof housing 255 is attached to the mask over at least a portion of the side lens 250. As explained previously, a display device 252 generates an image comprising information needed by the diver or other user. A reflecting surface 253 is used to fold the optical path taken by the image generated by the display device 252. A lens 254 is included to focus the image at or near infinity. The image is transmitted through the side lens 250 of the mask where it is next combined with the field of view image by a reflective and transmissive coating 251 formed on the inner surface of the front lens 154.

The front lens 154, in combination with the reflective and transmissive coating 251, performs the task of an optical combiner. Using the illustrated arrangement, the display information is superimposed upon the field of view at the reflective and transmissive coating 251 by reflecting the display information back to the eye E of the user and transmitting the field of view to the user's eye E.

The reflective and transmissive coating 251 can be a number of such coatings available in the art such as metallic or dielectric coatings, indium tin oxide coating, or other coatings as are known or may become known by those skilled in the art of optics and holographic optical elements. Importantly, as explained in connection with the other embodiments described herein, by controlling the focal lengths of the optical components, the magnification and apparent location of the display image can be specified, manipulated and controlled.

Figure 12B:
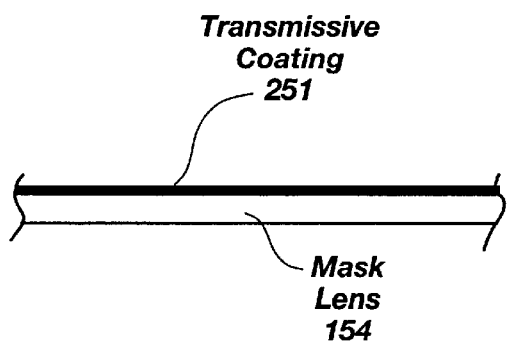
FIGS. 12B and 12C illustrate different arrangements for the optical components which are placed on the front lens of the diving mask.
Figure 12C:
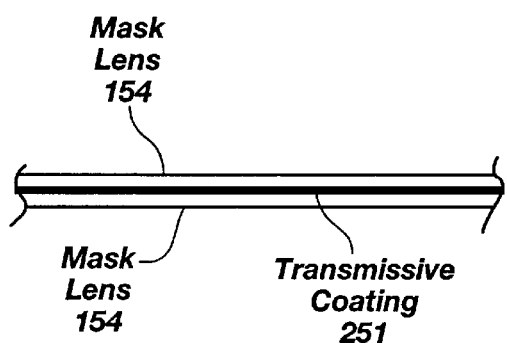

FIG. 12B shows one arrangement where the reflective and transmissive coating 251 is placed on the interior surface of the front lens 154. In order to prevent any potential problems with wear or damage to the reflective and transmissive coating 251, the arrangement illustrated in FIG. 12C can be used. In FIG. 12C reflective and transmissive coating 251 is shown sandwiched between two layers of the material to form the front lens 154 of the diving mask.

Figure 13A:
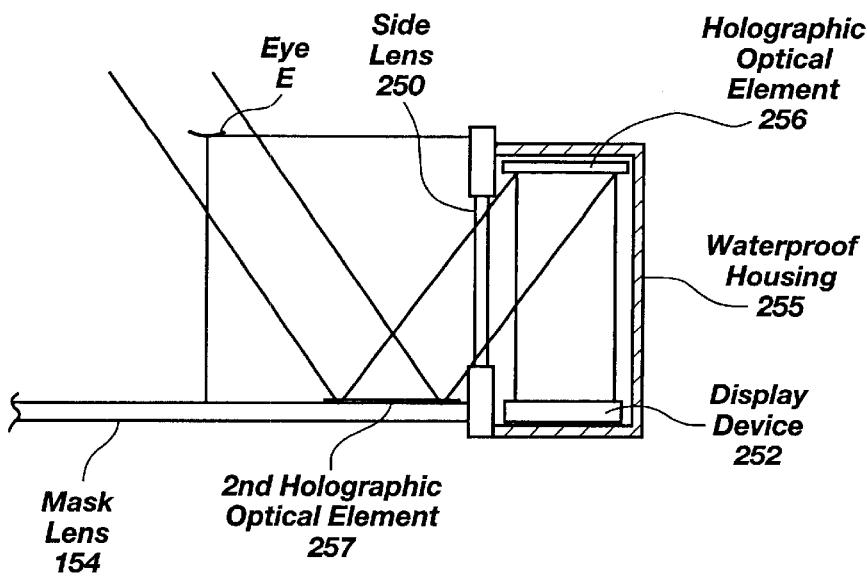
FIG. 13A illustrates another embodiment of the present invention by way of a top cross sectional view taken horizontally through a diving mask front and side lens with additional holographic optical structures being included for projecting the display data within the diver's field of view.

Referring next to FIG. 13A, an additional embodiment is represented wherein a holographic optical element (HOE) 256 is used to superimpose the information provided on a display device 252 onto the field of view of the user. HOE devices have properties which make them particularly advantageous for application in embodiments of the present invention.

An HOE is an optical element which is created using holography. An HOE can be formed from a variety of mediums and applied to any number of different substrates. HOEs operate on the principle of diffraction. In contrast Convention Optical Elements, e.g., lenses, prisms, mirrors, and beam splitters, operate on the principles of refraction and/or reflection. In many applications HOEs can function better than conventional optical elements. The properties of HOEs allow images to be focused to preselected points in space, or even to different points in space, much more easily than using conventional optical elements. In the embodiments of the present invention the relationship between the eye of the user and the optical components are relatively fixed. Thus, HOEs are well suited for use in embodiments of the present invention.

Further information concerning HOEs can be obtained from the publication LeRoy D. Dickson, "Holographic Optical Elements" *IBM Technical Report* TR 29.0364 (February 1983) and the publications referenced therein all of which are now incorporated herein by reference. General information regarding the optical holographic process can be obtained from the publication B. J. Thompson, "Principles and Applications of Optical Holography" Vol. VI *Applied Optics and Optical Engineering* p. 357 (ed. by Rudolf Kingslake) (1980) which is now incorporated herein by reference. Further information concerning holographic mirrors can be obtained from Jose R. Magarinos and Daniel J. Coleman, "Holographic Mirrors" Vol. 523 *Applications of Holography* p. 203 (1985) which is now incorporated herein by reference.

FIG. 13A shows the optical components in this embodiment are housed in a waterproof housing 255. The image generated by the display device 252 is reflected by the HOE 256 through the side lens 250 and the image of the surrounding environment viewed through the front lens 154 and a second HOE 257 are combined by the second HOE 257. Thus, the image of the display device 252, at the desired focus point, is superimposed onto the image seen at the user's field of view.

Figure 13B:
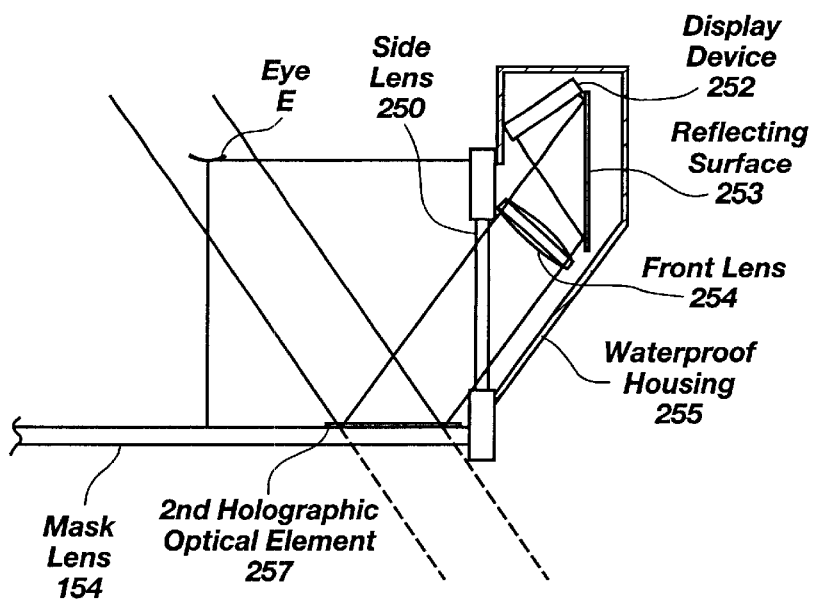
FIG. 13B illustrates still another embodiment of the present invention by way of a top cross sectional view taken horizontally through a diving mask front and side lens with another arrangement for holographic optical structures being included for projecting the display data within the diver's field of view.
Figure 13C:
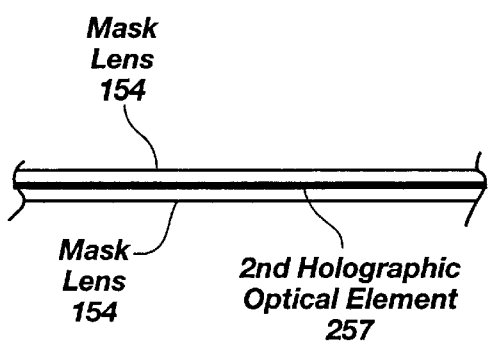
FIG. 13C illustrates one preferred placement of the holographic optical element which can be used in the embodiments of FIGS. 13A and 13B positioned between two layers of transparent material comprising the front lens of the diving mask.
Figure 13D:
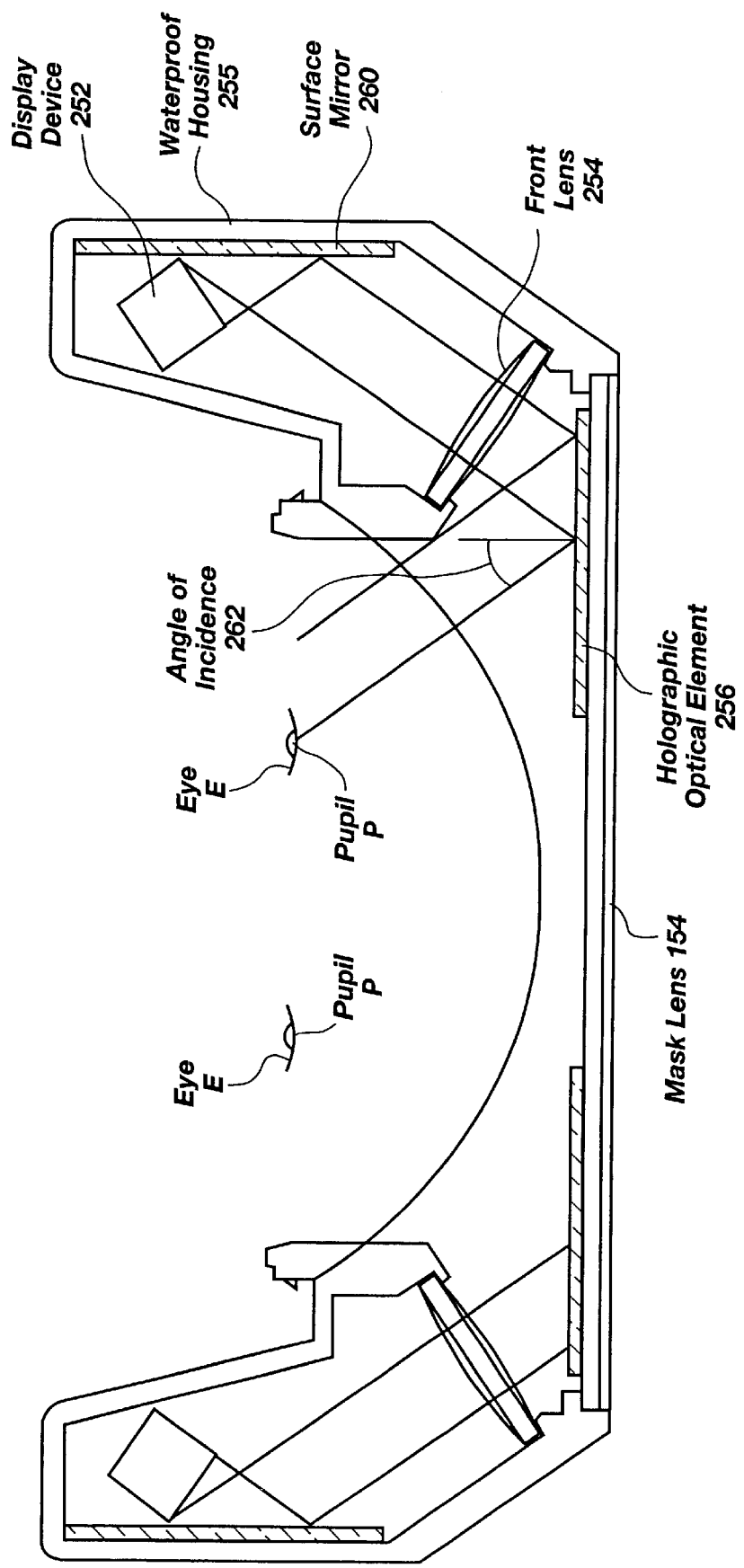
FIG. 13D illustrates another preferred embodiment of the present invention which also includes a holographic optical element.

It is within the skill of a worker in the art to select and arrange the optical elements so that the display device image is superimposed anywhere within the field of view of the user, i.e., left or right, up or down, or even superimposing images before both eyes thus creating a stereoscopic display such as in the embodiment of FIG. 13D. It will further be appreciated that the HOEs should be used to control dispersion as well as chromatic aberrations that are commonly experienced when using HOEs. It is also within the scope of the present invention to use an optical coating or HOE provided on the front lens 154 as a general filter to modify the appearance of the entire field of view.

FIG. 13B illustrates another embodiment of the invention wherein the HOE 257 is used in conjunction with the lens 254 and the reflective surface 253 to superimpose the image generated by the display device onto the field of view of the user. FIG. 13C illustrates how the HOE 257 used in is the embodiments of FIG. 13B and 13C can be placed within the front lens 154 itself rather that on the interior surface of the front lens 154 as is shown in FIGS. 13A and 13B.

FIG. 13D is a top sectional view of another embodiment of the present invention which utilizes an HOE. In FIG. 13D, both of the diver's eyes E are represented. It will be noted that in FIG. 3D (in contrast to the views provided in FIGS. 13A–13B) both sides of the mask are represented and that the appropriate components are provided on both sides of the mask, i.e., in front of each of the diver's eyes, to provide a stereo presentation of information if desired.

In the embodiment of FIG. 13D, a display device 252, which can preferably be a light emitting diode array, is mounted within a housing 255. The image of the display device 252 is reflected from a first surface mirror 260. The first surface mirror 260 can be one of any suitable first surface mirrors available in the art such as one available from Edmund Scientific Co. Catalog No. 42214. After being reflected from the first surface mirror 260, the image of the display device 252 passes through the lens 254 onto HOE 256 onto the diver's field of view. The lens 254 represented in FIG. 13D is preferably a convex lens such as one also available from Edmund Scientific Co. Catalog No. 32908 having a 100 mm focal length and a 40 mm diameter.

The HOE 256 represented in FIG. 13D can be placed on a plane parallel with that of the front lens 154 or can be integrated into the front lens 254. The image of the display device which is incident upon the HOE 256 is placed into the field of view at an appropriate focus distance. The pupil of the eye E is designated at P in FIG. 13D. The angle of incidence 262 represented in FIG. 13D can be any angle within a range which can be ascertained by one of skill in the art and one most preferably centered around about 35°. The presently preferred peak wavelength of the light making up the projected image is 652 nm. It will be appreciated that devices emitting other wavelengths can also be used.

As is readily apparent, each of the embodiments, effectively displays important information within the field of view of the user. The embodiments of FIGS. 12A–12C and 13A–13D can preferably use many of the same or similar components, steps, and programming code which was earlier described. It is within the spirit of the invention to accomplish the before recited objectives with all currently known combinations of optical and electrical components, exotic or ordinary, as well as with components and technology that may become known in the future.

In view of the foregoing, it will be appreciated that the present invention provides a dive computer system which conveys important information to a diver in a safer and more efficient manner than previously available devices as well as efficiently conveying important information to the diver without diverting the diver's attention away from the surrounding environment. The present invention also provides a dive computer system which can provide information to the diver directly in front of the diver's eye and always within the diver's field of view which does not block the diver's view of the surrounding environment. The present invention also provides a dive computer which does not present any hazardous high pressure hoses or consoles which can snag on, or get hung-up on, underwater objects and formations and which does not present any dangers to a diver such as the rupturing of a high pressure hose or severing of an electrical cable.

It will be further appreciated that the present invention provides a dive computer which is capable of providing a variety of needed and useful information to a diver without requiring the diver to divert his attention from the environment surrounding the diver, which includes a compass function, and which provides hands-free operation and which operates reliably when the diver is oriented in any of a number of orientations. The present invention further provides a dive computer which has a transparent display which superimposes information upon the diver's field of view and which does not block any of the diver's view of the surrounding environment and which operates for long periods of time on batteries and which presents continuously updated, in real time, important system and dive information. The present invention also can accommodate a variety of eyesight parameters, facial structures, and eye shapes and sizes.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system for conveying information to an underwater diver wearing a mask which includes a viewing window through which the diver is provided a field of view of the surrounding environment, the system comprising:

means for sensing the depth under the surface of the water the diver is submerged and for generating a depth signal;

means for processing the depth signal and generating a display signal;

means for displaying the information conveyed by the display signal within the diver's field of view such that the diver is able to visually perceive the information shown on the means for displaying, without any movement of an eye, within the diver's field of view; and means for holding the means for displaying in a position adjacent to the mask;

wherein the means for displaying comprises a display device, the display device comprising:

means for displaying the temperature of the water surrounding the diver;

means for displaying the minimum temperature of the water encountered on the most recent dive;

means for displaying the current depth under the surface of the water of the diver;

means for displaying the maximum depth under the surface of the water encountered on the most recent dive;

means for displaying the current pressure found within a tank; and means for displaying the elapsed time since the beginning of the most recent dive.

2. A system for conveying information to an underwater diver wearing a mask which includes a viewing window through which the diver is provided a field of view of the surrounding environment, the system comprising:

means for sensing the depth under the surface of the water the diver is submerged and for generating a depth signal;

means for processing the depth signal and generating a display signal;

means for displaying the information conveyed by the display signal within the diver's field of view such that the diver is able to visually perceive the information shown on the means for displaying, without any movement of an eye, within the diver's field of view; and means for holding the means for displaying in a position adjacent to the mask;

wherein the means for displaying comprises a display device, the display device comprising:

means for displaying the time remaining before a diver must ascend;

means for displaying to the diver a plurality of ascent stop levels needed to avoid decompression sickness; and means for displaying the diver's ascent rate; wherein the display device further comprises:

means for displaying the temperature of the water surrounding the diver;

means for displaying the minimum temperature of the water encountered on the most recent dive;

means for displaying the current depth under the surface of the water of the diver;

means for displaying the maximum depth under the surface of the water encountered on the most recent dive;

means for displaying the current pressure found within a tank; and means for displaying the elapsed time since the beginning of the most recent dive.

3. A system for conveying information to an underwater diver wearing a mask as defined in claim 2 wherein the means for displaying further comprises:

visual array means for providing a visually perceptible representation of the information conveyed by the display signal;

means for placing an image of the visual array means at a focus distance in the range from about six inches to about infinity in relation to the eye of the diver; and means for magnifying the actual image of the visual array means such that the diver can readily observe the image of the visual array means.

4. A system for conveying information to an underwater diver wearing a mask which includes a viewing window through which the diver is provided a field of view of the surrounding environment, the system comprising:

means for sensing the depth under the surface of the water the diver is submerged and for generating a depth signal;

means for processing the depth signal and generating a display signal;

means for displaying the information conveyed by the display signal within the diver's field of view such that the diver is able to visually perceive the information shown on the means for displaying, without any movement of an eye, within the diver's field of view; and means for holding the means for displaying in a position adjacent to the mask;

wherein the means for displaying comprises:
- a first display device;
- a first holographic optical element;
- a first lens and wherein the first display device, the first holographic optical element and the first lens provide an image of the output of the first display device superimposed upon the diver's field of view through a first eye of the diver;
- a reflecting surface;
- a second holographic optical element positioned in front of at least one of the diver's eyes;
- a second display device;
- a second holographic optical element; and
- a second lens and wherein the second display device, the second holographic optical element and the second lens provide an image of the output of the second display device superimposed upon the diver's field of view through a second eye of the diver.

5. A system for conveying information to an underwater diver wearing a mask which includes a viewing window through which the diver is provided a field of view of the surrounding environment, the system comprising:

means for sensing the pressure in at least one tank holding a breathable gas supplied to the diver and for generating a tank pressure signal;

means for processing the tank pressure signal and generating a display signal;

means for displaying the information conveyed by the display signal within the diver's field of view such that the information conveyed by the display signal is transparently superimposed onto the diver's field of view through at least a first eye of the diver and the diver is able to visually perceive the information conveyed by the display signal without any substantial movement of the first eye;

means for holding the means for displaying in a position adjacent to the mask; and means for sensing the ambient temperature of the surrounding environment and for generating a temperature signal and wherein the means for processing comprises means for processing the temperature signal and wherein the means for displaying comprises a display device, the display device comprising:
- means for displaying the temperature of the water surrounding the diver;
- means for displaying the minimum temperature of the water encountered on the most recent dive;
- means for displaying the current depth under the surface of the water of the diver;
- means for displaying the maximum depth under the surface of the water encountered on the most recent dive;
- means for displaying the current pressure found within the at least one tank; and
- means for displaying the elapsed time since the beginning of the most recent dive.

6. A system for conveying information to an underwater diver wearing a mask which includes a viewing window through which the diver is provided a field of view of the surrounding environment, the system comprising:

means for sensing the pressure in at least one tank holding a breathable gas supplied to the diver and for generating a tank pressure signal;

means for sensing the depth under the surface of the water the diver is submerged and for generating a depth signal;

means for detecting changes in the relative orientation of the earth's magnetic field and generating a compass signal with respect to the relative orientation in the earth's magnetic field;

means for sensing the ambient temperature of the surrounding environment and for generating a temperature signal;

means for processing the tank pressure signal, the compass signal, the temperature signal, and the depth signal and generating a display signal;

means for displaying the information conveyed by the display signal within the diver's field of view such that the information shown on the means for displaying is superimposed upon the diver's field of view, the means for displaying further comprising:
- first visual array means for providing a visually perceptible representation of the information conveyed by the display signal;
- a first holographic optical element; and
- a first reflecting surface, the first holographic optical element and the first reflecting surface cooperating to project the visually perceptible representation of the information conveyed by the display signal onto a lens of the mask and thus into the diver's field of view provided to at least a first eye of the diver; and means for holding the means for displaying in a position on the mask;

wherein the means for displaying further comprises:
- a second display device;
- a second holographic optical element; and
- a second lens and wherein the second display device, the second holographic optical element and the second lens provide an image of the output of the second display device superimposed upon the diver's field of view through a second eye of the diver.

* * * * *